(12) United States Patent
Opina, Jr. et al.

(10) Patent No.: US 12,647,023 B2
(45) Date of Patent: Jun. 2, 2026

(54) SYSTEMS AND METHODS FOR ADAPTIVE DEAD TIME CONTROL OF A DEVICE INTEGRATED WITH CONVERTERS THAT IMPLEMENT SOFT SWITCHING

(71) Applicant: Nanyang Technological University, Singapore (SG)

(72) Inventors: Gil Lampong Opina, Jr., Singapore (SG); Howe Li Yeo, Singapore (SG); Anshuman Tripathi, Singapore (SG)

(73) Assignee: Nanyang Technological University, Singapore (SG)

( * ) Notice: Subject to any disclaimer, the term of this patent is extended or adjusted under 35 U.S.C. 154(b) by 162 days.

(21) Appl. No.: 18/586,266

(22) Filed: Feb. 23, 2024

(65) Prior Publication Data

US 2025/0105726 A1     Mar. 27, 2025

(30) Foreign Application Priority Data

Sep. 22, 2023     (SG) ........................... 10202302679X

(51) Int. Cl.
| | |
|---|---|
| *H02M 1/38* | (2007.01) |
| *H02M 1/00* | (2006.01) |
| *H02M 3/335* | (2006.01) |

(52) U.S. Cl.
CPC ......... *H02M 1/385* (2021.05); *H02M 1/0058* (2021.05); *H02M 3/33584* (2013.01)

(58) Field of Classification Search
CPC .. H02M 3/33584; H02M 1/0058; H02M 1/38; H02M 1/385
See application file for complete search history.

(56) References Cited

U.S. PATENT DOCUMENTS

| | | | | |
|---|---|---|---|---|
| 9,812,979 | B1 * | 11/2017 | Tschirhart | ......... H02M 3/33592 |
| 10,658,936 | B2 * | 5/2020 | Sun | ........................ H02M 3/04 |
| 2015/0256074 | A1 | 9/2015 | Biondi et al. | |
| 2016/0146488 | A1 | 5/2016 | Ochiai et al. | |
| 2018/0367059 | A1 * | 12/2018 | Tsukano | .................. H02M 1/32 |
| 2020/0244210 | A1 * | 7/2020 | Waggel | ................. H02M 7/003 |

FOREIGN PATENT DOCUMENTS

WO          2018211164  A1      11/2018

* cited by examiner

*Primary Examiner* — Jue Zhang
*Assistant Examiner* — Jye-June Lee
(74) *Attorney, Agent, or Firm* — Sheppard Mullin Richter & Hampton LLP

(57)          ABSTRACT
A system comprises one or more sensors for determining sensor data, the sensor data including ambient parameters internal to the enclosure; a controller comprising one or more sensor interfaces configured to communicate with one or more sensors to receive the sensor data; one or more processors; and memory storing computer instructions configured to perform: determining, based on the sensor data, an existence or probability of condensation within the enclosure; and decreasing a dead time of the one or more soft switching mechanisms based on the existence or probability of condensation within the enclosure, the decreasing the dead time increasing heat in the converter circuitry to assist in addressing the existence or probability of condensation.

27 Claims, 16 Drawing Sheets

Controller 160

Dead Time Adjustment
Engine 402

FIG. 5B

Condensation Addressing
Engine 404

| | |
|---|---|
| Sensing Engine | 602 |
| Condensation Determining Engine | 604 |
| Circuit Component Switch Adjusting Engine | 606 |

603

Sensing Engine 602

Atmospheric Temperature Sensing Engine — 702

Atmospheric Temperature Sensing Interface — 704

Humidity Sensing Engine — 708

Humidity Sensing Interface — 710

Circuit Component Temperature Sensing Engine — 712

Circuit Component Temperature Sensing Interface — 714

Forecast Obtaining Engine — 716

Condensation Determining
Engine 604

Circuit Component Switch
Adjusting Engine 606

1000

1200

1350

SYSTEMS AND METHODS FOR ADAPTIVE DEAD TIME CONTROL OF A DEVICE INTEGRATED WITH CONVERTERS THAT IMPLEMENT SOFT SWITCHING

FOREIGN PRIORITY

This application claims the benefit under 35 U.S.C. § 119 to Singapore Provisional Application 10202302679X, filed Sep. 22, 2023, the contents of which are incorporated herein by reference in its entirety.

TECHNICAL FIELD

This disclosure pertains to systems and methods for adaptive dead time control in a device integrated with converters that implement soft switching.

BACKGROUND

Power electronics provide a newfound resiliency to the energy infrastructure. For example, power electronics transform voltages and currents from one voltage and/or shape to another, thereby efficiently supplying more flexible energy solutions. In addition, power electronics create frameworks by connecting distributed energy sources, such as solar, wind, and other renewable sources, to other power sources such as direct current (DC) and alternating current (AC) sources. Today, seventy percent of the electrical energy supply is processed by power electronics. Power electronics have created a metamorphosis in the energy infrastructure by provisioning energy to remote areas, converting previously polluting infrastructure into more environmentally friendly alternatives, and effectively addressing faults and/or abnormalities therein. At the same time, fully harnessing power electronics has introduced new challenges to preserve the lifespan and performance of the power electronics.

SUMMARY

A claimed solution rooted in computer technology overcomes problems specifically arising in the realm of computer technology, in particular, to maintenance and control of a device to prolong its lifespan and increase efficiency of operation. The claimed solution may reduce, eliminate, and/or prevent switching losses under different load conditions as well as reduce, eliminate, and/or prevent damage otherwise caused by condensation within the device.

The device may include a converter circuit. The converter circuit may be housed within an enclosure, a compartment, and/or chassis (hereinafter "enclosure"). For example, the converter circuit may include a dual active bridge (DAB), half bridge, full bridge, a different direct current (DC)-DC converter, a DC-alternating current (AC) converter, an AC-DC converter, a buck converter, and/or a boost converter. The converter circuit may have soft switching mechanisms, including zero voltage switching (ZVS) and/or zero current switching (ZCS). A controller associated with and/or integrated with the converter circuit may adaptively control, coordinate, or modify switching operations of the device. For example, the controller may control a pattern (sequence and/or duration) of transitioning of the switches between ON and OFF states. The controller may control the transitioning of switches corresponding to different current flow paths, conducting paths, complementary pairs, power stages and/or phase legs (hereinafter "current flow paths") of the converter circuit.

The controller may control the operations of the switches by adjusting a dead time corresponding to switches across different current flow paths. A dead time may refer to a period of time in which switches across the different current flow paths are in an OFF state, to sufficiently discharge a voltage, current, and/or capacitance across a switch. Initially, the controller may have a default dead time. In some embodiments, the dead time (e.g., the default dead time) may be adjusted according to a dead time adjustment mechanism, which may be implemented adaptively for different load attributes. For example, the dead time adjustment mechanism may control a dead time sufficient to discharge the output capacitance across a switch, prior to transitioning the switch from an OFF state to an ON state, according to the load attribute (e.g., high current load level, low current load level or a level therebetween). In particular, under low load levels, the dead time to sufficiently discharge the output capacitor may be higher compared to the dead time to sufficiently discharge the same output capacitor under high current load levels. The higher an amount of current flowing through the switch, the faster the capacitance from the output capacitor is discharged. In some embodiments, the dead time adjustment mechanism may additionally determine a dead time based on one or more characteristics of the converter circuit. The characteristics may include any of an efficiency of the converter circuit, a degree of utilization of the converter circuit, and/or degree of harmonic distortion of the converter circuit.

In some embodiments, the controller may toggle or turn off the dead time adjustment mechanism upon receiving an indication that condensation is occurring or is likely (predicted) to occur within the enclosure. The toggling off of the dead time adjustment mechanism may revert the controller to the default dead time. In other embodiments, upon receiving an indication of an amount or probability of condensation, the controller may modify the dead time previously specified by the dead time adjustment mechanism, according to determined or predicted condensation levels within the enclosure. By modifying the dead time, or toggling off the dead time adjustment mechanism, the controller may prevent, reduce or eliminate condensation within the device, thereby prolonging a lifespan and preventing failure of the converter circuit. Condensation may have a greater detrimental impact on failure of electronic components compared to other factors such as heat. Therefore, preventing, reducing, or eliminating condensation within the device may be crucial to maintaining operation of the device, specifically, the converter circuit.

The toggling off, or modification of, the dead time may be based on instantaneous and/or predicted sensor data, parameters and/or attributes (hereinafter "sensor data"). The sensor data may include, without limitation, an internal temperature within the enclosure, an external temperature external to the enclosure, and/or a relative humidity internal and/or external to the enclosure. The internal temperature, humidity, and/or other internal parameters may be measured at different locations within the enclosure, such as within a heat sink, within the converter circuitry, and/or at other locations. The controller may obtain the sensor data from sensors that detect the sensor data via interfaces linked with the sensors. The controller may determine or predict, from the sensor data, a level of condensation (e.g., an existence, amount, and/or probability of condensation) occurring within the enclosure during a current time or a future time.

The toggling off of the dead time adjustment mechanism, or the modification of the dead time, may encompass the controller controlling an adjustment of timing of the switches to decrease the dead time previously specified. On the other hand, if condensation is neither occurring nor likely to be occurring, the controller may either maintain the timing of the switches, or adjust the timing of the switches to increase the dead time from a previously decreased dead time.

In such a manner, the controller may simultaneously preserve a lifespan of electronic components within the converter circuit and increase the efficiency of the electronic components. Because condensation may be among most crucial factors leading to failure of the converter circuit, the controller may prioritize removal or reduction of any condensation present at a current time or likely to occur at a current time or a future time. The controller may also maintain soft switching mechanisms, including ZVS, to an extent possible.

Embodiments of the invention implement a system for controlling converter circuitry, the converter circuitry comprising switches and one or more soft switching mechanisms within an enclosure. The system comprises one or more sensors for determining sensor data, the sensor data including ambient parameters internal to the enclosure. The system further comprises a controller. The controller comprises one or more sensor interfaces configured to communicate with the one or more sensors to receive the sensor data. The controller includes one or more hardware processors and memory storing computer instructions, the computer instructions when executed by the one or more hardware processors configured to perform operations. The operations include determining, based on the sensor data, an existence or probability of condensation within the enclosure; and decreasing a dead time of the one or more soft switching mechanisms based on the existence or probability of condensation within the enclosure, the decreasing the dead time increasing heat in the converter circuitry to assist in addressing the existence or probability of condensation. Addressing may include preventing, reducing, or eliminating condensation.

In some embodiments, the switches include transistors. The one or more soft switching mechanisms may include zero-voltage switching. The dead time may be based on discharging capacitance across capacitors connected through one or more of the transistors. The converter circuitry may include a dual-active bridge (DAB). The converter circuitry may include one or more drivers for controlling the soft switching mechanisms of the converter circuitry and for controlling the dead time of the one or more soft switching mechanisms in response to control signals from the controller. The ambient parameters may include temperature and humidity. The sensor data may further include ambient parameters external to the enclosure. The decreasing of the dead time may be based on a deviation of the existence or probability of condensation from a threshold value. The threshold value may be based on a predetermined dewpoint. The probability of condensation may be a probability of an existence of condensation within the enclosure. The probability of condensation may be a probability of generation of condensation within the enclosure at a future time. The converter circuitry may include a half bridge. The adjusting the dead time of the one or more soft switching mechanisms may include adaptively adjusting the dead time based on load characteristics of a load. The adaptively adjusting the dead time may include determining an extent or duration of adjustment to the dead time. The duration of adjustment may depend on a load level. For example, the duration of adjustment may be higher when the load level is lower compared to when the load level is higher. The addressing the existence or probability of condensation may include preventing the condensation, reducing the condensation and/or eliminating the condensation.

In some embodiments, embodiments of the invention include a method for controlling converter circuitry, the converter circuitry comprising switches and one or more soft switching mechanisms within an enclosure. The method comprises: using one or more sensors to determine sensor data, the sensor data including the ambient parameters internal to the enclosure; determining, based on the sensor data, an existence or probability of condensation within the enclosure; and decreasing a dead time of the one or more soft switching mechanisms based on the existence or probability of condensation within the enclosure, the decreasing the dead time increasing heat in the converter circuitry to assist in addressing the existence or probability of condensation.

In some embodiments, the converter circuitry includes a dual-active bridge (DAB). The ambient parameters may include temperature and humidity. The sensor data may further include ambient parameters external to the enclosure. The decreasing of the dead time may be based on a deviation of the existence or probability of condensation from a threshold value. The probability of condensation may be a probability of an existence of condensation within the enclosure. The probability of condensation may be a probability of generation of condensation within the enclosure at a future time. The adjusting the dead time of the one or more soft switching mechanisms may include adaptively adjusting the dead time based on load characteristics of a load. The adaptively adjusting the dead time may include adjusting the dead time more when the load is lower and less when the load is higher.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIGS. 13A and 13B may be consistent with the circuit illustrated in FIG. 2.

DETAILED DESCRIPTION

Figure 1:
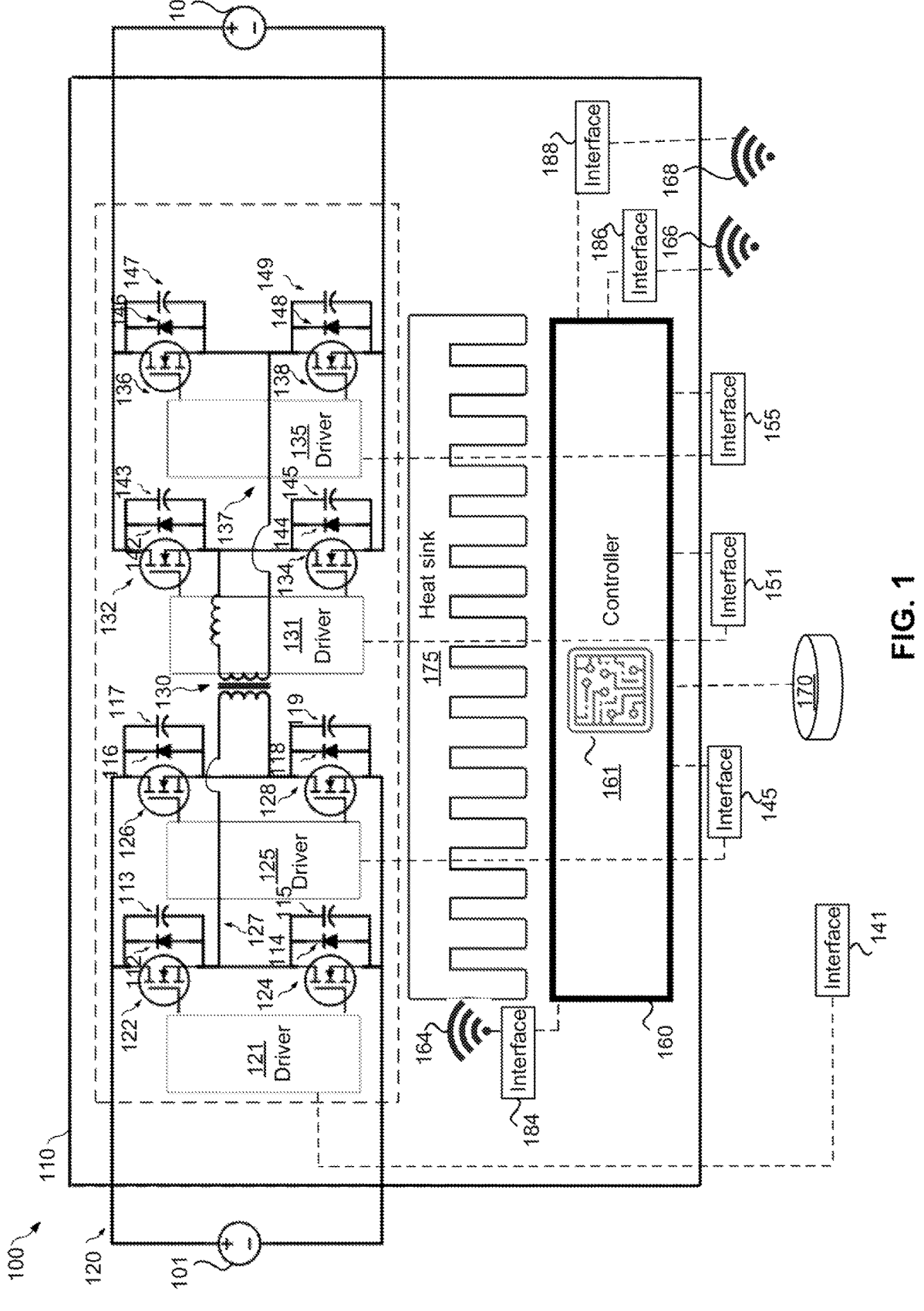
FIG. 1 is a diagram of a device having a dual active bridge (DAB) and a controller configured to control switches in the DAB to adaptively control a dead time. The adaptive control of the dead time may maintain soft switching mechanisms in order to reduce power losses such as switching losses, and/or reduce, prevent and/or eliminate condensation in the device, according to some embodiments of the present invention.

Power electronics disposed in a device may undergo losses such as switching losses during transitioning of switches between ON and OFF states. These switching losses compromise efficiency of the device. In some embodiments, a controller may be configured to control switches in the device, in particular, within a circuit. The controlling of the switches may be in an adaptive pattern that reduces switching losses, under different load conditions. In particular, the adaptive pattern may be versatile enough to be implemented under high and low load conditions. In some embodiments, switches may operate in complementary pairs. That is to say, one switch is on when the other is off with the exception of the time interval during the dead time. The controller may be configured to implement a dead time adjustment mechanism, which adaptively controls a dead time in the device, depending on one or more load attributes. Dead time refers to the time when both switches within a complementary pair of switches are placed in an OFF state so that current does not conduct across the pair. In some embodiments, current may still conduct in reverse during the dead-time period through a diode connected in anti-parallel to the switch. This diode may be a parasitic diode internal to the switch or an additional external diode. In some embodiments, the dead time may be controlled using circuitry, that measures characteristics such as voltages and/or current to control the dead time, while maintaining a minimum dead time and a maximum dead time. In some embodiments, the load attributes may include a load level (e.g., the amount of current passing through the device), a change in the load level, a rate of change of the load level, and/or other metrics associated with the load level over time.

Further, power electronics, especially if disposed within an outdoor device, have risk of damage due to condensation forming within an enclosure that can threaten delicate circuitry. In some embodiments, the controller may be configured to control the switches in a circuit in a pattern that creates heat to reduce, prevent or eliminate condensation in the device. Such control may entail toggling or turning on/off the dead time adjustment mechanism, or modifying a previous dead time from the dead time adjustment mechanism. When toggling off the dead time adjustment mechanism, the controller may revert to a default dead time. When modifying the previous dead time, the extent of the modification may depend on a level of condensation or a potential for condensation forming as well as on the load attributes.

In some embodiments, the circuit includes a converter that provides galvanic isolation and uses soft switching mechanisms, for example, mechanisms for controlling the transitioning (e.g., activation and/or deactivation) of switches (e.g., transistors). Soft switching mechanisms may apply a timing pattern for the transitioning of switches that reduces power loss caused by capacitance, voltage and/or current being driven across the switches during the transitioning. Soft switching mechanisms may include zero voltage switching (ZVS) and/or zero current switching (ZCS). In ZVS, a switch is transitioned ON and OFF when the voltage across the switch is zero or near zero. In particular, during ZVS, an output capacitance of the switch discharges to zero or near zero before the switch is switched ON. The output capacitance may arise from an internal capacitance of the switch and/or from a separate capacitor in parallel with the switch. Meanwhile, in ZCS, a switch is transitioned ON and OFF when the current across the switch is zero or near zero. Using soft switching, the controller implements the dead time adjustment mechanism to reduce switching losses by providing sufficient dead time for the capacitance to discharge. Additionally, soft switching prevents current flow from one switch unintentionally resulting in a voltage or a current across a different switch.

In some embodiments, by implementing the dead time adjustment mechanism, a controller is used to adaptively control the dead time, to customize ZVS under different load conditions. The adaptive control of the dead time may entail controlling timing of transitioning the states of the switches between ON and OFF. In particular, the controller may adaptively control the dead time to be at least a duration required for sufficient discharging of the output capacitance before switching the switch to an ON state. Here, sufficient discharging may be construed as discharging completely or at least some capacitance (e.g., a portion of the originally stored capacitance). This duration may depend on load levels of the circuit because higher load levels cause higher currents, which causes the capacitance to discharge more quickly compared to lower load levels and lower currents. For example, if the device or the circuit is operating within a first load range, assume the output capacitance is sufficiently discharged after 10 microseconds. The controller may adaptively set the dead time to be at least 10 microseconds under such conditions. Meanwhile, if the device or the circuit is operating within a second load range higher than the first load range, assume that the output capacitance is sufficiently discharged after 2 microseconds. The controller may adaptively set the dead time to be at least 2 microseconds under such conditions. The setting of the dead time may include setting discrete durations of dead time for different load ranges, or alternatively, a continuous sliding scale of durations depending on different load levels under which the device is operating. In some embodiments, this timing may be controlled by circuitry that measures characteristics such as voltages and/or current to control the dead time, while maintaining a minimum dead time (so that short circuits do not occur) and a maximum dead time.

Upon detecting condensation or a potential for condensation forming, the controller may either toggle off the aforementioned dead time adjustment mechanism or modify the dead time according to the dead time adjustment mechanism. For example, the controller may maintain the dead time adjustment mechanism in some embodiments when the level of condensation is at or below a threshold condensation level or in some embodiments when the potential for condensation forming is at or below a threshold potential. On the other hand, the controller may at least partially reduce or stop soft switching by adaptively modifying the previous dead time, to generate heat when the level of condensation or potential for condensation forming is above the threshold level. In some embodiments, the controller may toggle or turn off the dead time adjustment mechanism, and instead revert to a fixed dead time. Such a measure may be undertaken to prolong circuit lifespan by reducing, preventing, and/or eliminating condensation. In some embodiments, the controller may control the dead time reduction based on an amount of deviation of the level of condensation from the threshold level or the amount of potential for condensation forming. In some embodiments, additionally or alternatively, the controller may modify a timing of when the dead time occurs (e.g., shifting a previously scheduled dead time taking place during a first time range between 4 us and 5 us to a second time range between 6 us and 7 μs).

In one example, when the device is operating within the second load range, assume that the controller previously determines the dead time according to the dead time adjustment mechanism to be 2 microseconds. The controller may determine to reduce the dead time to a first range of times, say between 0.5 microseconds and 1.5 microseconds, depending on a level (e.g., amount or probability) of condensation. In this example, if the controller determines amount or probability of condensation to be a first level, the controller may determine to reduce the dead time by a first proportion or percentage (e.g., 25 percent) to 1.5 microseconds. Meanwhile, if the controller determines amount or probability of condensation to be at a second level higher than the first level, the controller may determine to reduce the dead time by a second proportion or percentage (e.g., 50 percent) to 1 microsecond.

In another example, when the device is operating within the first load range, assume that the controller previously determines the dead time according to the dead time adjustment mechanism to be 10 microseconds. The controller may determine to reduce the dead time to a second range of times, say between 2.5 microseconds and 7.5 microseconds, depending on an amount or probability of condensation. In this example, if the controller determines the amount or probability of condensation to be at a first level, the controller may determine to reduce the dead time by the first proportion or percentage (e.g., 25 percent) to 7.5 microseconds. If the controller determines the amount or probability of condensation to be at a second level higher than the first level, the controller may determine to reduce the dead time by a second proportion or percentage (e.g., 50 percent) to 5 microseconds. In the above example, the proportion of reduction of dead time is assumed to be constant for a particular amount or probability of condensation, no matter the load range the device is operating at. Alternatively, in other examples, the proportion of reduction of dead time may be different for a particular amount or probability of condensation at different load ranges.

In some embodiments not including adaptive dead time control, the reduction of the dead time due to the amount or probability of condensation may revert to a default dead time, and/or may be the same regardless of the load. Such situations may arise if the dead time adjustment mechanism is toggled or turned off. In some embodiments, the reduction of the dead time may be, or result in, at least partial elimination of soft switching regardless of the load and regardless of the deviation from any thresholds.

When the controller determines that the amount or probability of condensation is at or below the threshold level (amount or probability), following a reduction in the dead time, the controller may increase the dead time from the reduced dead time previously implemented. The increasing of the dead time may return the full operation, or at least restore a portion of the previous reduction of, the soft switching process. In some embodiments, the controller may control the amount of dead time increase based on the deviation of the amount or probability of condensation from the threshold level.

In some embodiments not including adaptive dead time control, the resumption of the dead time may be the same regardless of the load. In some embodiments, the resumption of the dead time may be the full return of the previously reduced dead time regardless of the load and regardless of the deviation from any thresholds.

In some embodiments, the device includes an enclosure housing components including the converter and the controller. The controller may cooperate with sensors to determine the amount or probability of condensation based on sensor data. The sensor data may include parameters, including ambient parameters such as internal temperature within the enclosure, external temperature outside the enclosure, relative humidity internal to the enclosure and/or relative humidity external to the enclosure, and/or condensation level within the enclosure. The controller may further cooperate with one or more sensors to sense voltage, via mechanisms such as a voltage clamp, across one or more switches. The sensed voltage may be used to determine or verify that a circuit is operated under ZVS.

The controller may include interfaces to communicate with the sensors, e.g., to activate the sensors and obtain the sensor data from the sensors. The controller may determine (e.g., predict) from the parameters whether or not condensation is currently occurring within the enclosure and/or likely to be forming within the enclosure in the future. For example, determining the level of condensation now or in the future may be based on whether the internal temperature is approaching (e.g., within a threshold difference of), or below, a dewpoint temperature. If the internal temperature is approaching or below the dewpoint temperature, then the controller may determine that condensation is likely present or likely to be present in the device. If the internal temperature is at or above the dewpoint temperature, or is not approaching the dewpoint temperature, then the controller may determine that condensation is unlikely present or unlikely to be present in the device. In response to the controller determining that condensation is likely present or likely to be present, the controller may adjust a timing of the switches to decrease the previous dead time between switches in one or more current flow paths. Assuming a fixed duration cycle, decreasing the dead time increases a duty cycle (e.g., a period of time that a current flow path within the circuit is actively conducting), as well as increases switching losses, which generates heat, thereby reducing, eliminating or preventing condensation. In some embodiments, the controller may control the amount of dead time reduction based on the amount of deviation from the threshold level.

The controller may generate and transmit control signals or instructions to one or more drivers, which may directly control switching of a switch. In response to receiving the signals or instructions, the drivers may transmit one or more control signals to one or more switches. In some embodiments, the one or more drivers may implement one or more functionalities previously attributed to the controller.

The aforementioned principles will be described in the foregoing figures, which illustrate different types of circuits that implement different switching mechanisms and the control of the switching mechanisms to maintain soft switching and to compensate for condensation.

FIG. 1 depicts a diagram of an infrastructure 100, containing an example device 105 having a controller 160 for controlling switching behaviors of transistors to maintain soft switching and to compensate for condensation or potential condensation. The device 105 is housed, either partially or entirely, within an enclosure 110. The device 105 includes a circuit 120 in need of protection, e.g., a converter circuit 120. The converter circuit 120 includes transistors 122, 124, 126, 128, 132, 134, 136, and 138 operating in a soft switching mode, and may include a transformer 130. In FIG. 1, the converter circuit 120 may include a dual-active bridge (DAB). For the converter circuit of 120, complementary switch pairs are the pair consisting of transistors 122 and 124, 126 and 128, 132 and 134 and finally 136 and 138. The converter circuit 120 may include additional circuit components such as diodes and/or capacitors to reduce reverse conduction losses and limit voltage slew rate respectively. The diodes illustrated may represent internal parasitic diodes of the transistors 122, 124, 126, 128, 132, 134, 136, and 138 and/or additional external diodes. The capacitors illustrated may represent internal capacitances of the transistors 122, 124, 126, 128, 132, 134, 136, and 138 and/or additional capacitances. Furthermore, capacitances across the capacitors are to be discharged sufficiently prior to turning on of the transistors 122, 124, 126, 128, 132, 134, 136, and 138. In particular, the converter circuit 120 may include a diode 112 and a capacitor 113 in parallel with the transistor 122, a diode 114 and a capacitor 115 in parallel with the transistor 124, a diode 116 and a capacitor 117 in parallel with the transistor 126, a diode 118 and a capacitor 119 in parallel with the transistor 128, a diode 142 and a capacitor 143 in parallel with the transistor 132, a diode 144 and a capacitor 145 in parallel with the transistor 134, a diode 146 and a capacitor 147 in parallel with the transistor 136, and a diode 148 and a capacitor 149 in parallel with the transistor 138. A power source 101 within the infrastructure 100 may be coupled to the converter circuit 120 to supply power to converter circuit 120 for power conditioning. An output load 102 within the infrastructure 100 may be coupled to the output of converter circuit 120. The converter circuit of 120 conditions power for the output load and regulates the output voltage if required.

One or more drivers 121, 125, 131 and 135 control switching the transistors 122, 124, 126, 128, 132, 134, 136, and 138 ON and OFF by sending a control (e.g., voltage) signal to the gate of each transistor 122, 124, 126, 128, 132, 134, 136, and 138. The controller 160 may control the drivers 121, 125, 131 and 135. In some embodiments, the control signal may include a pulse width modulation (PWM) pulse. If the control signal transmitted to a transistor has an amplitude that exceeds a threshold voltage (e.g., a gate voltage), then the control signal controls the transistor to turn ON. Otherwise, if a driver does not transmit the control signal or if control signal has an amplitude or voltage lower than the threshold voltage, then the transistor will remain OFF. In other examples, the drivers 121, 125, 131 and 135 may operate in an opposite manner. In some embodiments, the controller 160 controls the drivers 121, 125, 131 and 135 using an adaptive dead-time control protocol or pattern to control one, some or all of the transistors belonging to different current flow paths to coordinate and synchronize the dead time.

As shown in FIG. 1, the driver 121 may control the transistors 122 and 124. The driver 125 may control the transistors 126 and 128. The driver 131 may control the transistors 132 and 134. The driver 135 may control the transistors 136 and 138. Although FIG. 1 illustrates one driver controlling two transistors, a driver may control a different number of transistors or control different transistors at different times. For example, a driver may, at one point in time, send a signal to a first transistor to switch the first transistor to an ON state while refraining from sending a signal to a second transistor to maintain the second transistor in an OFF state. In other alternative embodiments, one driver may control switching OFF and ON of a single transistor, or any number of transistors (e.g., four transistors or eight transistors).

Within the converter circuit 120, a first current flow path may be defined between the transistor 122, a path 127 and transistor 128. The transistors 122 and 128 may be both in an ON state or in an OFF state, as regulated by the drivers 121 and 125. A second current flow path may be defined between the transistor 126, the path 127, and the transistor 124. Thus, the transistors 126 and 124 may be both in an ON state or in an OFF state, as regulated by the drivers 125 and 121. A third current flow path may be defined between the transistor 132, a path 137, and the transistor 138. Thus, the transistors 132 and 138 may be both in an ON state or in an OFF state, as regulated by the drivers 131 and 135. A fourth current flow path may be defined between the transistor 136, the path 137, and the transistor 134. Thus, the transistors 132 and 138 may be both in an ON state or in an OFF state, as regulated by the drivers 131 and 135. Current flow from a left bridge (e.g., the components on the left side of the transformer 130), such as current flowing through the transistors 126 and 128, may be transmitted via induction to a right bridge on the other side of the transformer 130. Meanwhile, current flow from the right bridge, such as current flowing through the transistors 132 and 134, may be transmitted via induction to the left bridge. In such a manner, the circuit 120 facilitates bidirectional transfer of energy. In other embodiments with different configurations, and more than two current flow paths within a single bridge, at most one current flow path is permitted to be active at a given point in time.

In FIG. 1, an entire cycle within the left bridge may include the following operation cycles 1. a first operation cycle, in which the transistors 122 and 128 are in an ON state while the transistors 126 and 124 are in an OFF state, 2. a first dead time in which the transistors 126, 124, 122, and 128 are all in an OFF state, 3. a second operation cycle in which the transistors 126 and 124 are in an ON state while the transistors 122 and 128 are in an OFF state, 4. a second dead time in which the transistors 126, 124, 122, and 128 are all in an OFF state, 5. followed by the first operation cycle.

TABLE 1

| | Transistor 122 | Transistor 124 | Transistor 126 | Transistor 128 |
|---|---|---|---|---|
| First operation cycle | on | off | off | on |
| First dead time | off | off | off | off |
| Second operation cycle | off | on | on | off |
| Second dead time | off | off | off | off |

Similarly, an entire cycle within the right bridge may include the following operation cycles 1. a third operation cycle in which the transistors 132 and 138 are in an ON state while the transistors 136 and 134 are in an OFF state, 2. a third dead time in which the transistors 136, 134, 132, and 138 are all in an OFF state, 3. a fourth operation cycle in which the transistors 136 and 134 are in an ON state while the transistors 132 and 138 are in an OFF state, 4. a fourth dead time in which the transistors 136, 134, 132, and 138 are all in an OFF state, 5. followed by the third operation cycle.

The third operation cycle corresponds to the third current flow path being active while the fourth current flow path is inactive. The fourth operation cycle corresponds to the fourth current flow path being active while the third current flow path is inactive.

In some embodiments, the controller 160 may detect indications of current and/or voltages across one or more of the transistors in order to control the dead time according to the dead time adjustment mechanism. The voltages may be detected using a voltage clamp detection circuit. Additionally or alternatively, the controller 160 may receive an indication when a drain-to-source voltage across one or more of the transistors is approaching zero voltage. The controller 160 may also use circuitry to control minimum and maximum dead times.

In some embodiments, the operation cycles (e.g., the third and fourth operation cycles) within the right bridge may or may not overlap with the operation cycles of the left bridge (e.g., the first and second operation cycles). In other words, for example, the third operation cycle and/or the fourth operation cycle may operate dependently upon or alternatively, independently from the first operation cycle and/or the second operation cycle. The third operation cycle and/or the fourth operation cycle have a same or different starting time, duration, and/or ending time compared to the first operation cycle and/or the second operation cycle. In some examples, the first dead time may be staggered with the third dead time and/or the fourth dead time, and the second dead time may also be staggered with the third dead time and/or the fourth dead time. For example, the first dead time may occur between a time t=4 microseconds and t=5 microseconds while the second dead time may occur between a time t=8 microseconds and t=9 microseconds. The third dead time may occur between a time t=2 microseconds and t=3 microseconds and the fourth dead time may occur between a time t=6 microseconds and t=7 microseconds. A summary of the operation cycles within the right bridge, including whether each of the transistors 136, 134, 132, and 138 are in an ON state or an OFF state, is provided in Table 2 below.

TABLE 2

| | Transistor 132 | Transistor 134 | Transistor 136 | Transistor 138 |
|---|---|---|---|---|
| Third operation cycle | on | off | off | on |
| Third dead time | off | off | off | off |
| Fourth operation cycle | off | on | on | off |
| Fourth dead time | off | off | off | off |

The controller 160 may include software, hardware (e.g., one or more hardware processors), and/or firmware to control operations of the converter circuit 120. These operations may include determining one or more load attributes within the converter circuit 120 and implementing a dead time adjustment mechanism based on the load attributes. One example of the dead time adjustment mechanism is shown in Table 3 below. If a load within the converter circuit 120 is within a first current load range, then the dead time sufficient for discharging capacitance of the capacitor (e.g., the capacitor 113, 115, 117, 119, 143, 145, 147, and/or 149) and/or of voltages across the transistor (e.g., the transistor 122, 124, 126, 128, 132, 134, 136, and/or 138) may be a first duration (e.g., 10 μs). If a load within the converter circuit 120 is within a second current load range, which is higher than the first current load range, then the dead time may be a second duration (e.g., 2 μs), which is lower than the first duration. If a load within the converter circuit 120 is within a third current load range, which is higher than the second current load range, then the dead time may be a third duration (e.g., 1 μs), which is lower than the first and second durations. If a load within the converter circuit 120 is within a fourth current load range, which is higher than the third current load range, then the dead time may be a fourth duration (e.g., 0.5 μs), which is lower than the first, second, and third durations. These example values are merely exemplary and used to illustrate a concept that the dead time adjustment mechanism may set different dead times under different current load ranges. In particular, the dead time may be inversely correlated with a loading level of the converter circuit 120. Any number of load ranges may be contemplated. In other embodiments, the dead time adjustment mechanism may adjust the dead time based on a continuous scale, rather than based on discrete ranges of load.

TABLE 3

| | Dead time |
|---|---|
| First loading range | 10 μs |
| Second loading range | 2 μs |
| Third loading range | 1 μs |
| Fourth loading range | 0.5 μs |

The controller 160 may monitor a minimum dead time clock, current or voltage across one or more transistors, and a maximum dead time clock to determine when to initiate and expire dead time. After the minimum dead time clock has expired, the controller 160 controls the dead time to expire based on the first of the discharge of the capacitor to reach a threshold level or expiration of the maximum dead time clock to occur.

In some embodiments, the controller 160 obtains sensor data, which may include conditions such as ambient conditions, as represented by parameters including ambient parameters such as humidity and/or temperature internal and/or external to the enclosure 110. The controller 160 may obtain the sensor data from one or more sensors 164 and/or 166 via one or more interfaces 184 and/or 186. Although shown as two sensors 164 and 166, any number of sensors and any position of sensors is possible. Further, each sensor 164 and 166 may include multiple sensors, and each interface 184 and 186 may include multiple interfaces. The controller 160 may determine the existence or probability of condensation based on any or all of the parameters. In one example, the controller 160 may determine whether the internal temperature is at or above a dewpoint temperature. In response to determining that the internal temperature is at or above the dewpoint temperature, the controller 160 may determine that condensation or probability of condensation within the enclosure 110 is unlikely (e.g., at or below the threshold level). On the other hand, if the controller 160 determines that the internal temperature is below the dewpoint temperature, the controller 160 may also evaluate the external temperature and humidity to determine whether condensation or probability of condensation within the enclosure 110 is likely (e.g., above the threshold level).

If the controller 160 determines that the amount or probability of condensation is above the threshold level, the controller 160 may transmit one or more control signals to one or more of the drivers 121, 125, 131, and 135 to toggle off the dead time adjustment mechanism, which may institute a default dead time. Alternatively, the controller 160 may decrease a dead time from the previous dead time (e.g., the durations shown in Table 3) between switches in different current flow paths. The previous dead time was from the dead time adjustment mechanism. For example, the controller 160 may transmit one or more control signals to the drivers 121 and 125 to decrease the dead time (e.g., the first dead time and/or the second dead time) and/or to increase a duration of the first operation cycle and/or the second operation cycle. Additionally or alternatively, the controller 160 may transmit one or more control signals to the drivers 131 and 135 to decrease the dead time (e.g., the third dead time and/or the fourth dead time). By decreasing the dead time, the controller 160 via the drivers 121, 125, 131, and/or 135 may increase the internal temperature towards the dew point temperature, thereby eliminating, reducing or preventing the condensation within the device 105.

One example of addressing condensation by decreasing a previous dead time is shown in Table 4 below. If the converter circuit 120 is operating within a first current load range, and a level of condensation has been determined to be within (e.g., at or below) the threshold level, then the dead time may be unadjusted from the previous dead time according to the dead time adjustment mechanism (e.g., as shown in Table 3). However, if the amount or probability of condensation is above the threshold level, then the dead time may be adjusted from the previous dead time. The extent of adjustment may be based on an amount of deviation of the amount or probability of condensation from the threshold level. If the level of condensation is within the first condensation level, which is higher than the threshold level, then the controller 160 may determine to reduce the dead time by a first proportion (e.g., by 25 percent), say to 7.5 μs, 1.5 μs, 0.75 μs, or 0.375 μs, depending on whether the load of the converter circuit 120 is within the first load range, the second load range, the third load range, or the fourth load range, respectively. If the level of condensation is within the second condensation level, which is higher than the first condensation level, then the controller 160 may determine to reduce the dead time by a second proportion (e.g., by 50 percent), say to 5 μs, 1 μs, 0.5 μs, or 0.25 μs, depending on whether the load of the converter circuit 120 is within the first load range, the second load range, the third load range, or the fourth load range, respectively. If the level of condensation is within the third condensation level, which is higher than the second condensation level, then the controller 160 may determine to reduce the dead time by a third proportion (e.g., by 75 percent), say to 2.5 μs, 0.5 μs, 0.5 μs, 0.25 μs, or 0.125 μs, depending on whether the load of the converter circuit 120 is within the first load range, the second load range, the third load range, or the fourth load range, respectively.

Table 4 is merely used to illustrate a concept that depending on a condensation level and a load range, the controller 160 may modify a dead time from a previous dead time (e.g., according to the dead time adjustment mechanism). Any number of load ranges and/or levels of condensation may be implemented. In other embodiments, the modifying of the dead time may be based on a continuous scale, rather than based on discrete ranges of load.

TABLE 4

|  | Threshold condensation level | First condensation level | Second condensation level | Third condensation level |
|---|---|---|---|---|
| First loading range | 10 μs | 7.5 μs | 5 μs | 2.5 μs |
| Second loading range | 2 μs | 1.5 μs | 1 μs | 0.5 μs |
| Third loading range | 1 μs | 0.75 μs | 0.5 μs | 0.25 μs |
| Fourth loading range | 0.5 μs | 0.375 μs | 0.25 μs | 0.125 μs |

In some embodiments, following reduction of the previous dead time, when the controller 160 determines that the level of condensation is below the threshold level, the controller 160 may transmit one or more control signals to one or more of the drivers 121, 125, 131, and 135 to increase the dead time (e.g., the first dead time, the second dead time, the third dead time, and/or the fourth dead time). The controller 160 may thus reduce the internal temperature to prevent heating the converter circuit 120, as well as restoring any soft switching (e.g., ZVS) that was lost due to previous decrease of the dead time.

In some embodiments, the controller 160 transmits and/or receives signals to and/or from the one or more interfaces 184, 186, 141, 145, 151, and/or 155. In some examples, the interfaces 184, 186, 141, 145, 151, and/or 155 constitute circuit interfaces and/or client interfaces. In FIG. 1, the interface 184 may receive and transmit signals between the controller 160 and the sensor 164. The interface 186 may receive and transmit signals between the controller 160 and the sensor 166. The interface 141 may receive and transmit signals between the controller 160 and the driver 121. The interface 145 may receive and transmit signals between the controller 160 and the driver 125. The interface 151 may receive and transmit signals between the controller 160 and the driver 131. The interface 155 may receive and transmit signals between the controller 160 and the driver 135. Other configurations that include different numbers and/or arrangements of interfaces are also contemplated.

In some embodiment, the interfaces 141, 145, 151, and/or 155 may convert commands from the controller 160 into signals, such as by generating an electrical pulse having an amplitude of at least a gate voltage to switch a transistor to an ON state. The interfaces 141, 145, 151, and/or 155 may obtain feedback signals from the drivers 121, 125, 131, and/or 135, such as whether a transistor was successfully switched to an ON state). The interfaces 184 and 186 may communicate sensor signals, such as operational signals (e.g., temperature and/or humidity values) and/or any state information (e.g., whether sensor data was successfully obtained) from the sensors 164 and 166 to the controller 160. The interfaces 184 and 186 may receive activation signals from the controller 160.

In some examples, the interfaces 184, 186, 141, 145, 151, and/or 155 may be configured via control signals and/or user interfaces as needed. The controller 160 may store data in a datastore 170, which may be used for evaluating historical performance information, machine learning, and configuring dead time control based thereon.

The device 105 may also contain a heat sink 175 therein, thereon or adjacent thereto. The heat sink 175 may operate to remove heat from (and/or add heat to) the enclosure 110. However, notably, the heat sink 175 may be intended to more globally protect the entire device 105, whereas the dead time adjustment mechanism and any further modification or toggling off of a dead time may more locally protect the converter circuit 120.

Figure 2:
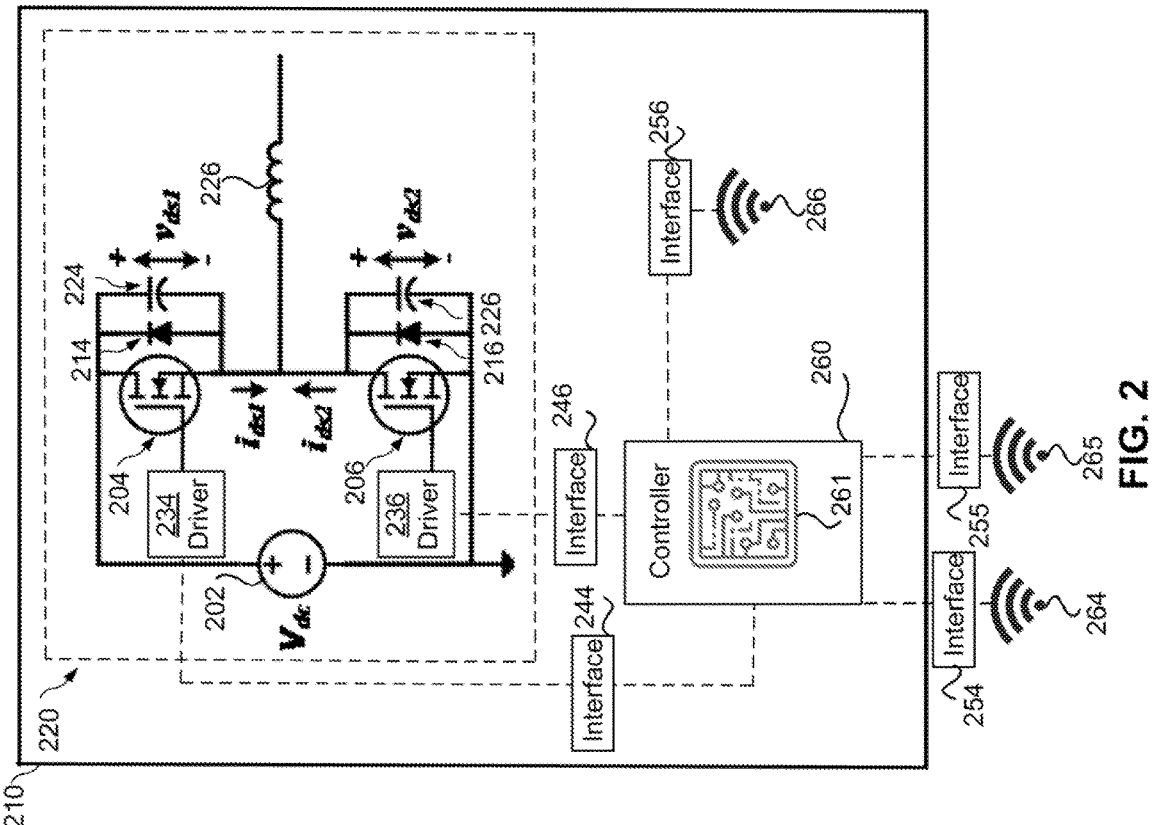
FIG. 2 is a diagram of device having a half-bridge converter and a controller configured to control switches in the converter to reduce switching losses and/or reduce, prevent and/or eliminate condensation in the device, according to some embodiments of the present invention.

FIG. 2 is a diagram of an infrastructure 200 having a device 205 containing a circuit 220 (e.g., a converter) and a controller 260 configured to control switches in the circuit 220 to reduce, prevent and/or eliminate condensation in the device 205, according to some embodiments of the present invention. FIG. 2 illustrates similar or analogous concepts as with regard to FIG. 1 but utilizes a half bridge converter circuit 220 instead of a DAB 120. Relevant principles described in FIG. 1 may also be applicable to FIG. 2. At least a portion of the device 205 may be housed within an enclosure 210. The circuit 220 may include transistors 204 and 206 which are switches in a complementary pair operating in a soft switching mode, as well as an inductive load 227. In some embodiments, the transistor 204 may be a high side transistor while the transistor 206 may be a low side transistor. In parallel with the transistors 204 and 206 may be additional circuit components such as a diode and/or a capacitor to improve reverse conduction losses and limit voltage slew rate respectively. In particular, the circuit 220 may include a diode 214 and a capacitor 224 in parallel with the transistor 204, and a diode 216 and a capacitor 226 in parallel with the transistor 206. A power source 202 may supply power to the transistors 204 and 206. The capacitors 224 and 226 are to be sufficiently discharged prior to switching the transistors 204 and 206 to an ON state, in order to maintain ZVS.

One or more drivers 234 and 236 may control switching of the transistors 204 and 206 OFF and ON by sending a control signal to the gate of each of the transistors 204 and 206. As in FIG. 1, the control signal may include a PWM pulse. If the control signal transmitted to a transistor has an amplitude that exceeds a threshold (e.g., a gate voltage), then the control signal may signal a transistor to switch a transistor from an OFF state to an ON state. Otherwise, if a driver does not transmit the control signal, or if the driver transmits a control signal having a lower than the threshold, then the transistor may be switched to an OFF state. In other examples, the drivers may operate in an opposite manner. For example, a driver may transmit a control signal to signal a transistor to switch from an ON state to an OFF state, although for the sake of simplicity, a control signal is assumed to signal a transistor to switch from an OFF state to an ON state.

Within the circuit 220, a first current flow path may be defined through the transistor 204 and the inductive load 226. Here, the transistor 204 may be in an ON state as regulated by the driver 234, while the transistor 206 may be in an OFF state as regulated by the driver 236. A second current flow path may be defined through the transistor 206 and the inductive load 227. Here, the transistor 206 may be in an ON state as regulated by the driver 236, while the transistor 204 may be in an OFF state as regulated by the driver 234. Thus, the drivers 234 and 236 will regulate at most one of the transistors 204 and 206 from being ON at any given time.

Operation cycles within the converter circuit 220 may include a first operation cycle, in which the transistor 204 is in an ON state while the transistor 206 is in an OFF state, a first dead time in which the transistors 204 and 206 are both in an OFF state, a second operation cycle in which the transistor 206 is in an ON state while the transistor 204 is in an OFF state, a second dead time in which the transistors 204 and 206 are both in an OFF state, followed by the first operation cycle. The first operation cycle corresponds to the first current flow path being active while the second current flow path is inactive. The second operation cycle corresponds to the second current flow path being active while the first current flow path is inactive. A summary of the operation cycles within the left bridge, including whether each of the transistors 204 and 206 are in an ON state or an OFF state, is provided in Table 5 below.

TABLE 5

|  | Transistor 204 | Transistor 206 |
|---|---|---|
| First operation cycle | on | off |
| First dead time | off | off |
| Second operation cycle | off | on |
| Second dead time | off | off |

The controller 260 may include software, hardware (e.g., one or more hardware processors), and/or firmware to control operations of the circuit 220. These operations may include determining one or more load attributes within the circuit 220 and implementing a dead time adjustment mechanism based on the load attributes. Principles of the dead time adjustment mechanism may be same or similar as that explained above with respect to FIG. 1. If a load within the circuit 220 is within a first current load range, then the dead time sufficient for discharging capacitance of the capacitor (e.g., the capacitor 224 and/or 226) and/or of voltages across the transistor (e.g., the transistor 204 and/or 206) may be a first duration (e.g., 10 μs). If a load within the circuit 220 is within a second current load range, which is higher than the first current load range, then the dead time may be a second duration (e.g., 2 μs), which is lower than the first duration. If a load within the circuit 220 is within a third current load range, which is higher than the second current load range, then the dead time may be a third duration (e.g., 1 μs), which is lower than the second duration. If a load within the circuit 220 is within a fourth current load range, which is higher than the third current load range, then the dead time sufficient may be a fourth duration (e.g., 0.5 μs), which is lower than the first, second, and third durations. In some embodiments, additionally or alternatively, the controller 260 may detect, and/or otherwise receive indications of, voltages across one or more of the transistors in order to set and/or verify a dead time according to the dead time adjustment mechanism. The voltages may be detected using a voltage clamp detection circuit. Additionally or alternatively, the controller 260 may receive an indication when a drain-to-source voltage across one or more of the transistors is approaching zero voltage.

Figure 13A:
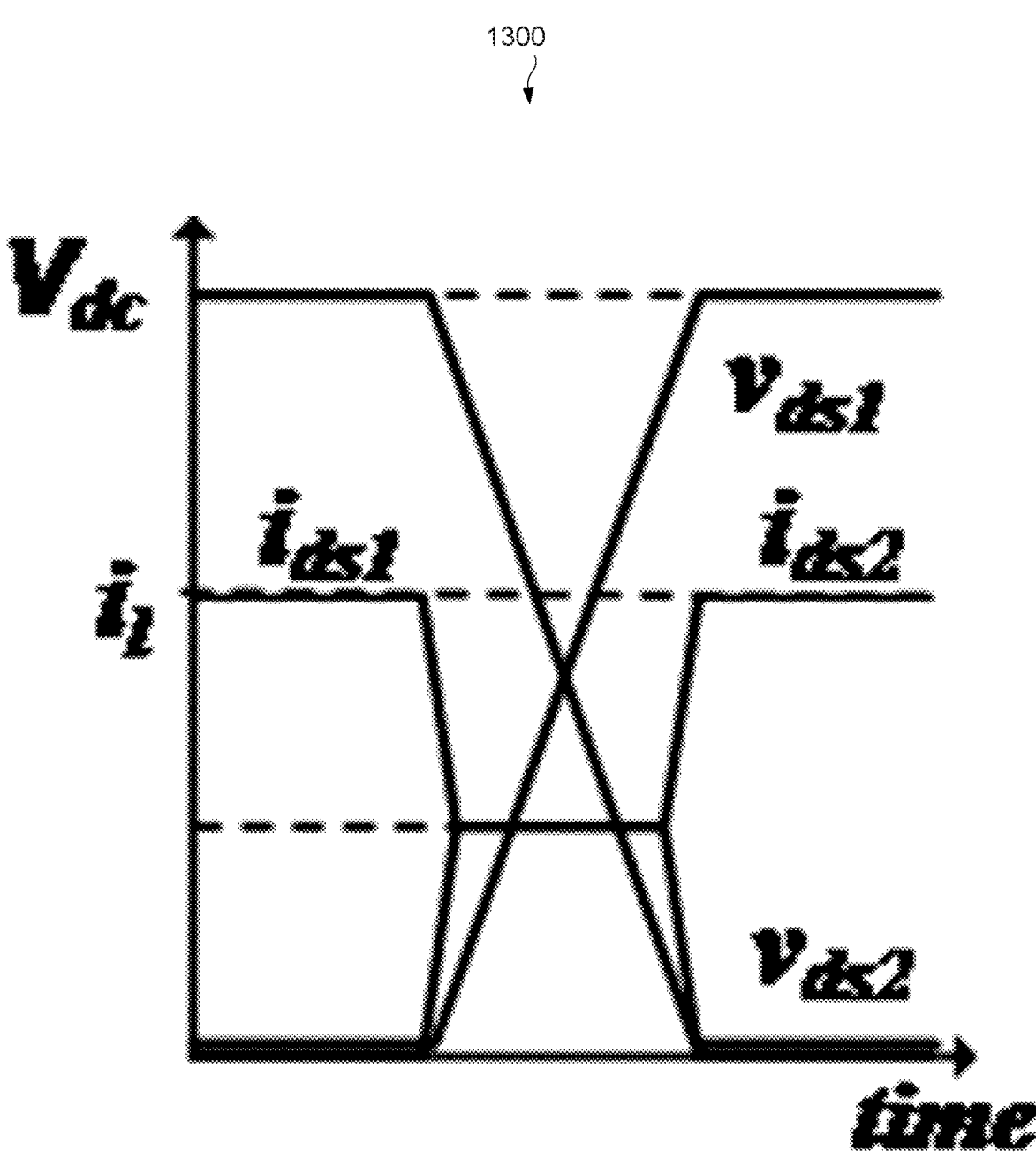
FIG. 13A is a chart illustrating relationships of current and voltage across a transistor under ZVS conditions, according to some embodiments of the present invention.
Figure 13B:
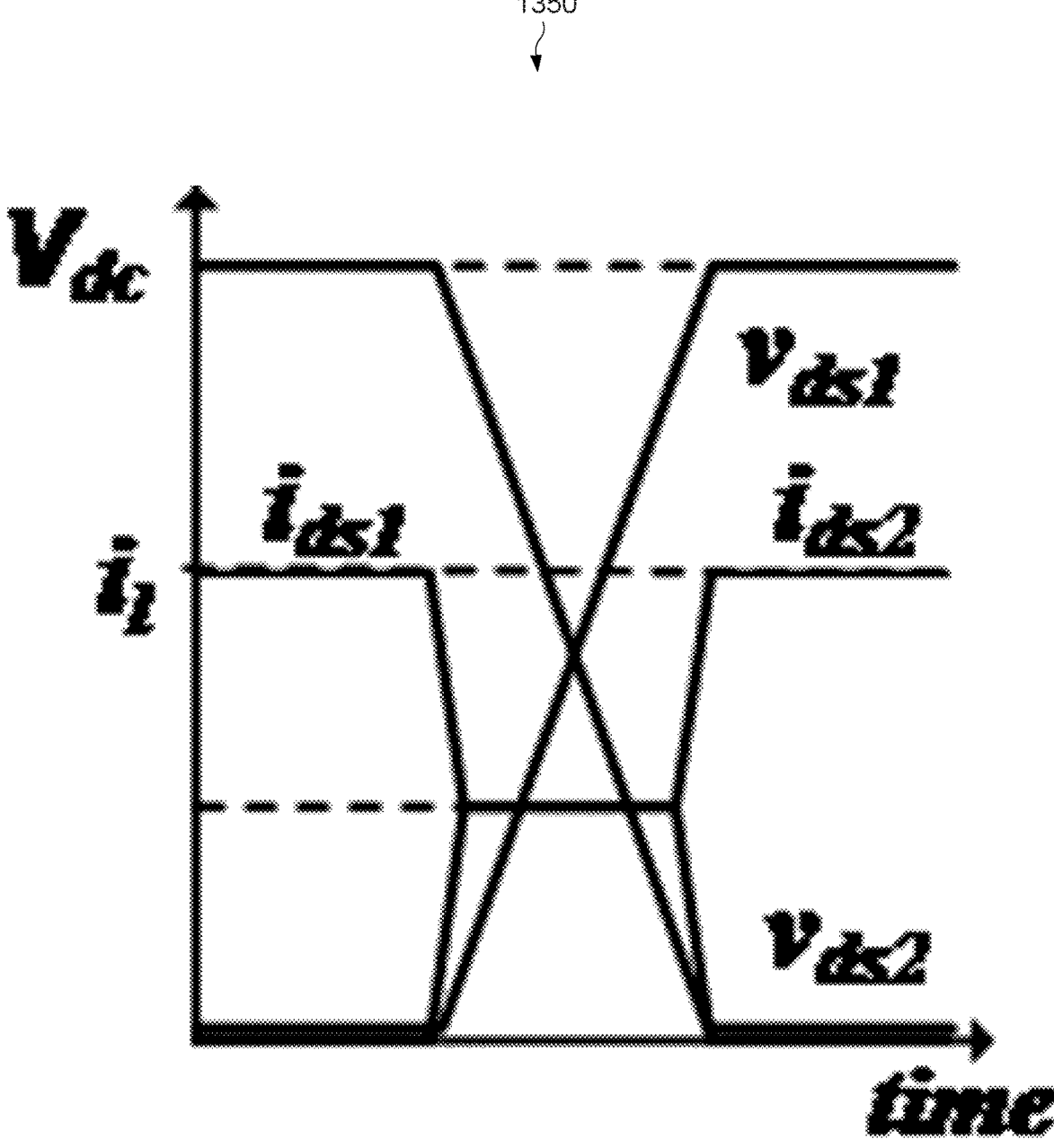
FIG. 13B is a chart illustrating relationships of current and voltage across a transistor under partial ZVS conditions, according to some embodiments of the present invention.

To maintain zero voltage switching, voltage $V_{ds1}$ and $V_{ds2}$ across each of the transistors 204 and 206, respectively, may be maintained at zero or near-zero during switching ON and switching OFF of that transistor, as illustrated in chart 1300 of FIG. 13A. In contrast, chart 1350 of FIG. 13B illustrates a scenario of quasi-resonant switching, in, which the switching ON and switching OFF occur at nonzero voltages $V_{ds1}$ and $V_{ds2}$.

The controller 260 may include software, hardware, and/ or firmware to control operations of the circuit 220. These operations may include determining or predicting (hereinafter "determining") an amount or probability of condensation within the device 205, and selectively transmitting one or more controls signals or instructions to either or both of the drivers 234 and 236 via interfaces 244 and 246 based on the determination.

In some embodiments, the controller 260 monitors sensor conditions such as ambient conditions, as represented by parameters such as humidity and/or temperature internal and/or external to the enclosure 210. The controller 260 may monitor the ambient conditions by obtaining sensor data from one or more sensors 264 and/or 266 via one or more interfaces 254 and/or 256. Although shown as two sensors 264 and 266, any number of sensors and any position of sensors is possible. Further, each sensor 264 and 266 may include multiple sensors, and each interface 254 and 256 may include multiple interfaces. The controller 260 may determine the existence or probability of condensation based on any or all of the parameters. In one example, the controller 260 may determine whether the internal temperature is at or above a dewpoint temperature, or approaching the dewpoint temperature. In response to determining that the internal temperature is at or above the dewpoint temperature, or not approaching the dewpoint temperature, the controller 260 may determine that condensation within the enclosure 210 or the probability of condensation forming within the enclosure 210 is unlikely (e.g., at or below the threshold level). On the other hand, if the controller 260 determines that the internal temperature is below the dewpoint temperature, or approaching the dewpoint temperature, the controller 260 may also evaluate the external temperature and humidity to determine whether condensation within the enclosure 210 or the probability of condensation within the enclosure 210 is likely (e.g., above the threshold level).

If the controller 260 determines that the amount or probability of condensation is above the threshold level, the controller 260 may transmit one or more control signals to one or more of the drivers 234 and/or 236 to toggle off the dead time adjustment mechanism, or alternatively, decrease a dead time from the previous dead time between switches in different current flow paths. For example, the controller 260 may transmit one or more control signals to the drivers 234 and/or 236 to decrease the dead time (e.g., the first dead time and/or the second dead time) and/or to increase a duration of the first operation cycle and/or the second operation cycle. By toggling off the dead time adjustment mechanism, or decreasing the dead time, the controller 260 via the drivers 234 and/or 236 may increase the internal temperature towards the dew point temperature, thereby eliminating, reducing or preventing the condensation within the device 205.

Principles illustrated with respect to Table 4 and FIG. 1, regarding decreasing a previous dead time, are also applicable to FIG. 2. If a load within the converter circuit 220 is within a first current load range, and an amount or probability of condensation has been determined to be within (e.g., at or below) the threshold level, then the dead time may be unadjusted from the previous dead time according to the dead time adjustment mechanism. However, if the amount or probability of condensation is above the threshold level, then the dead time may be adjusted from the previous dead time. The extent of adjustment may be based on an amount of deviation of the amount or probability of condensation from the threshold amount or probability of condensation.

When the controller 260 determines that the amount or probability of condensation is below the threshold level, the controller 260 may transmit one or more control signals to one or more of the drivers 234 and/or 236 to increase the dead time (e.g., the first dead time, the second dead time). The controller 260 may thus reduce the internal temperature to prevent heating the circuit 220, as well as restoring any soft switching (e.g., ZVS) that was lost due to previous decrease of the dead time. In some embodiments, the controller 260 transmits and/or receive signals to and/or from the one or more interfaces 254, 256, 244, and/or 246. In some examples, the interfaces 254, 256, 244, and/or 246 constitute circuit interfaces and/or client interfaces.

In some embodiments, the controllers 160 and/or 260 may be implemented in conjunction with different types of circuits. For example, the controllers 160 and/or 260 may be implemented in conjunction with a buck converter. The buck converter may include a downstream or output (hereinafter "output") inductor. A clamp switch may be connected across the output inductor. During a dead time, closing of the clamp switch (e.g., transitioning the clamp switch to an ON state) may result in circulating of current stored in the output inductor. The circulating of the current may establish a zero voltage difference, or a near zero voltage difference, across a transistor. An end of the dead time may coincide with reopening of the clamp switch, and transitioning the transistor from an OFF state to an ON state. Thus, in such a scenario of a buck converter, the adjustment of a dead time may include regulating a switching state of the clamp switch, in particular, regulating a duration in which the clamp switch is ON.

Figure 3:
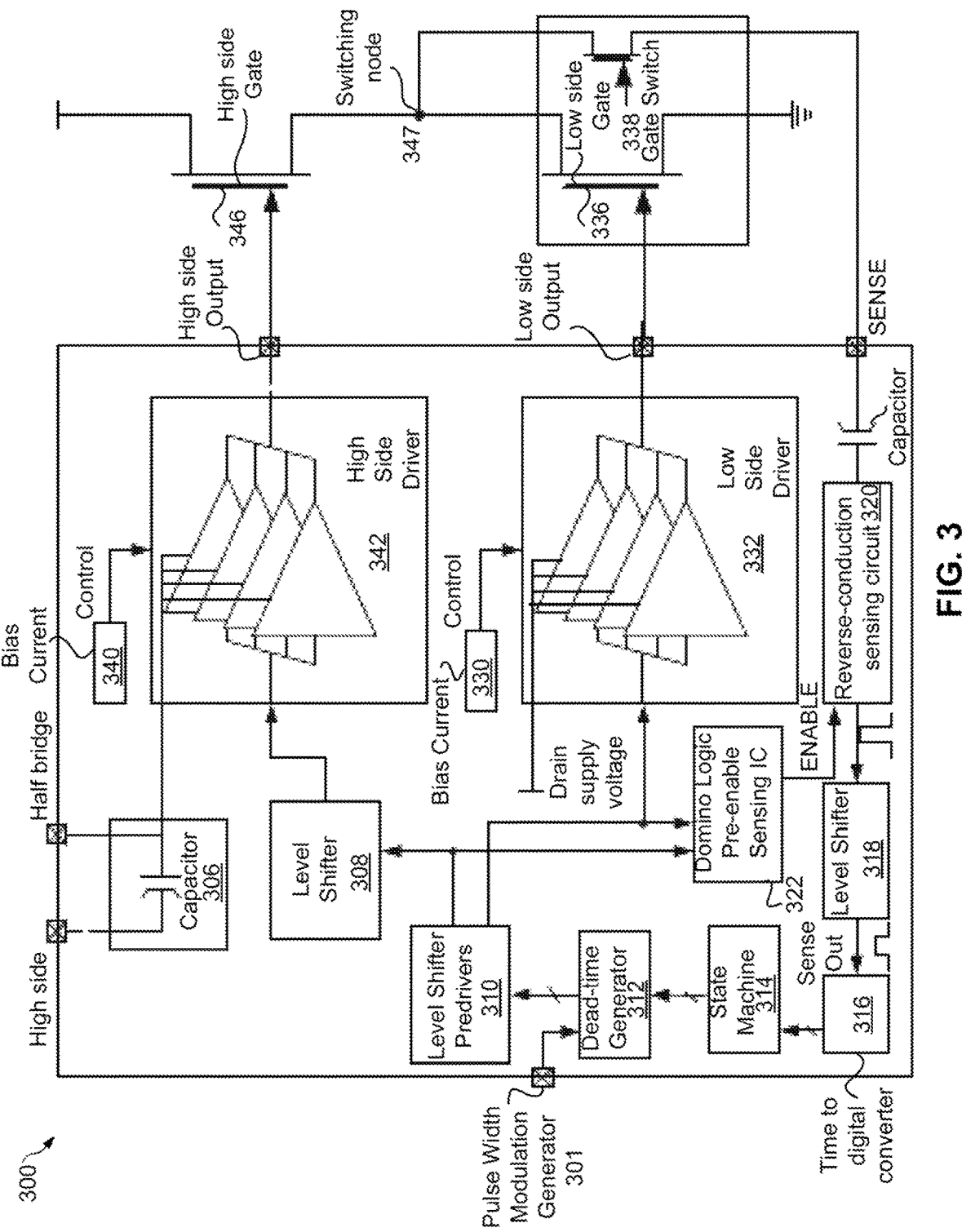
FIG. 3 is a block diagram illustrating details of an example gate driver 300 for controlling switching of switches, according to some embodiments of the present invention.

FIG. 3 is a block diagram illustrating details of an example gate driver 300, for controlling switches to effect dead time control, according to some embodiments of the present invention. The gate driver 300 may be implemented with the device 205 of FIG. 2 and/or with the device 105 of FIG. 1, specifically, receiving logic-level input signals from the controller 160 and/or 260. The gate driver 300 has an additional capability of detecting and responding to reverse conduction, which occurs when current is flowing in a reverse direction from a low side gate 336 towards a high side gate 346. The gate driver 300 may detect a reverse conduction state via a reverse-conduction sensing circuit 320. Such a reverse conduction state may occur at a zero voltage across the low side gate 336. Upon receiving a signal from the reverse-conduction sensing circuit 320 regarding a reverse conduction state, a low side switch 322 may immediately transition the low side gate to an ON state. Immediately transitioning the low side gate at that time facilitates ZVS without incurring additional conduction losses resulting from reverse conduction.

The gate driver 300 operates to implement dead time control. The gate driver 300 may receive a logic-level input signal 301 from the controller 160, 260. The logic-level input signal 301 may indicate a transitioning of a state of the high side gate 346 or of the low side gate 336. More specifically, the logic-level input signal 301 may indicate a dead time control measure to be implemented, and/or timings or intervals at which dead time is to be implemented. The logic-level input signal 301 may indicate whether the dead time adjustment mechanism is to be toggled on or off, depending on loading conditions and/or the level of condensation. A dead-time generator 312 may interpret and/or translate the logic-level input signal 301 into a specific dead time control measure to be implemented. As explained with regard to FIGS. 1 and 2, the specific dead time control measure may include the dead time adjustment mechanism, a modified version of the dead time adjustment mechanism, the default dead time, or any other dead time control measure.

Next, an output from the dead-time generator 312 may be fed to level shifter predrivers 310. The level shifter predrivers 310 may convert and/or translate signals from the dead-time generator 312 to provide compatible control signals to the drivers (e.g., the high side driver 342, the low side driver 332). In particular, the level shifter predrivers 310 may account for the high side driver 342 and/or the low side driver 332 operating at a higher voltage, current, power rating, and/or using different signaling methods compared to other elements within the gate driver 300. For example, the level shifter predrivers 310 may translate logic signals from one voltage level to another voltage level, such as from 1.8 Volts to 5 Volts. Next, outputs from the level shifter predrivers 310 may be fed to a level shifter 308 on a high side and/or to the low side drivers 332. An output from the level shifter 308 may be fed into the high side driver 342. The high side driver 342 may provide a signal (e.g., a PWM signal) to turn ON the high side gate 346, while the low side driver 332 may provide a signal to turn ON the low side gate 336. The high side gate 346 may be connected to a switching node 347 for a switch 338, which may belong to a different or secondary circuit.

An output from the level shifter predrivers 310 may be fed to a domino logic pre-enable sensing integrated circuit (IC) 322, which may have or be connected to an enable pin that transmits a signal to the reverse conduction sensing circuit 320. This signal triggers activation of the reverse-conduction sensing circuit 320. In other words, generating of a dead time control measure, by the dead-time generator 312, causes the reverse-conduction sensing circuit 320 to be activated. Here, the reverse-conduction sensing circuit 320 is a feedback mechanism that will turn off or terminate a dead time upon detection of reverse conduction across the low side gate 336. More particularly, a signal from the reverse-conduction sensing circuit 320 may be fed into a level shifter 318 to be converted and/or translated. The level shifter 318 may translate signals from one voltage level to another voltage level, such as from 5 Volts to 1.8 Volts. An output from the level shifter 318 may be fed to a time-to-digital converter 316 to record a timing that the reverse-conduction sensing circuit detects reverse conduction, and/or a duration of an ongoing dead time. A state machine 314, upon receiving an indication of reverse conduction from the time-to-digital converter 316, may switch a state of the gate driver 300 to cancel an ongoing dead time due to detection of the reverse conduction. The state machine 314 may transmit an indication to the dead-time generator 312 to cancel an ongoing dead time.

Additionally, the gate driver 300 includes a capacitor 306 (e.g., an internal bootstrap capacitor) linked to the high side driver 342 and one or more bias currents 340 and 330 provided to the high side driver 342 and the low side driver 332, respectively. In some embodiments, functionalities designated to the controllers 160 and/or 260 may be delegated to the gate driver 300.

Figure 4A:
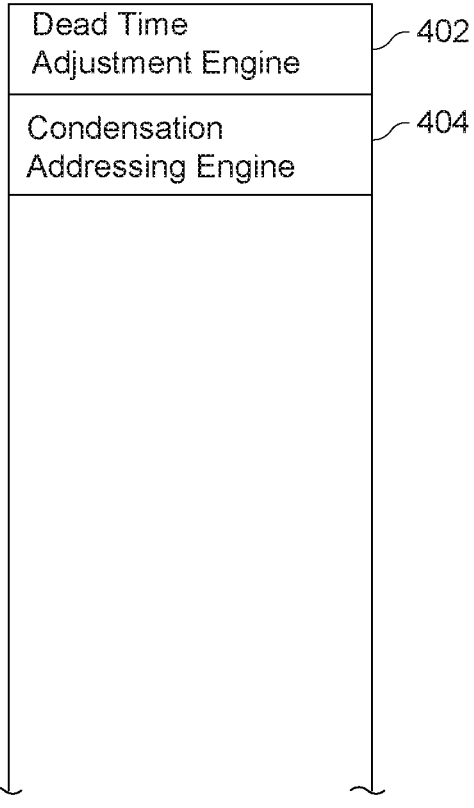
FIG. 4 is a block diagram illustrating details of a controller, according to some embodiments of the present invention.
Figure 4B:
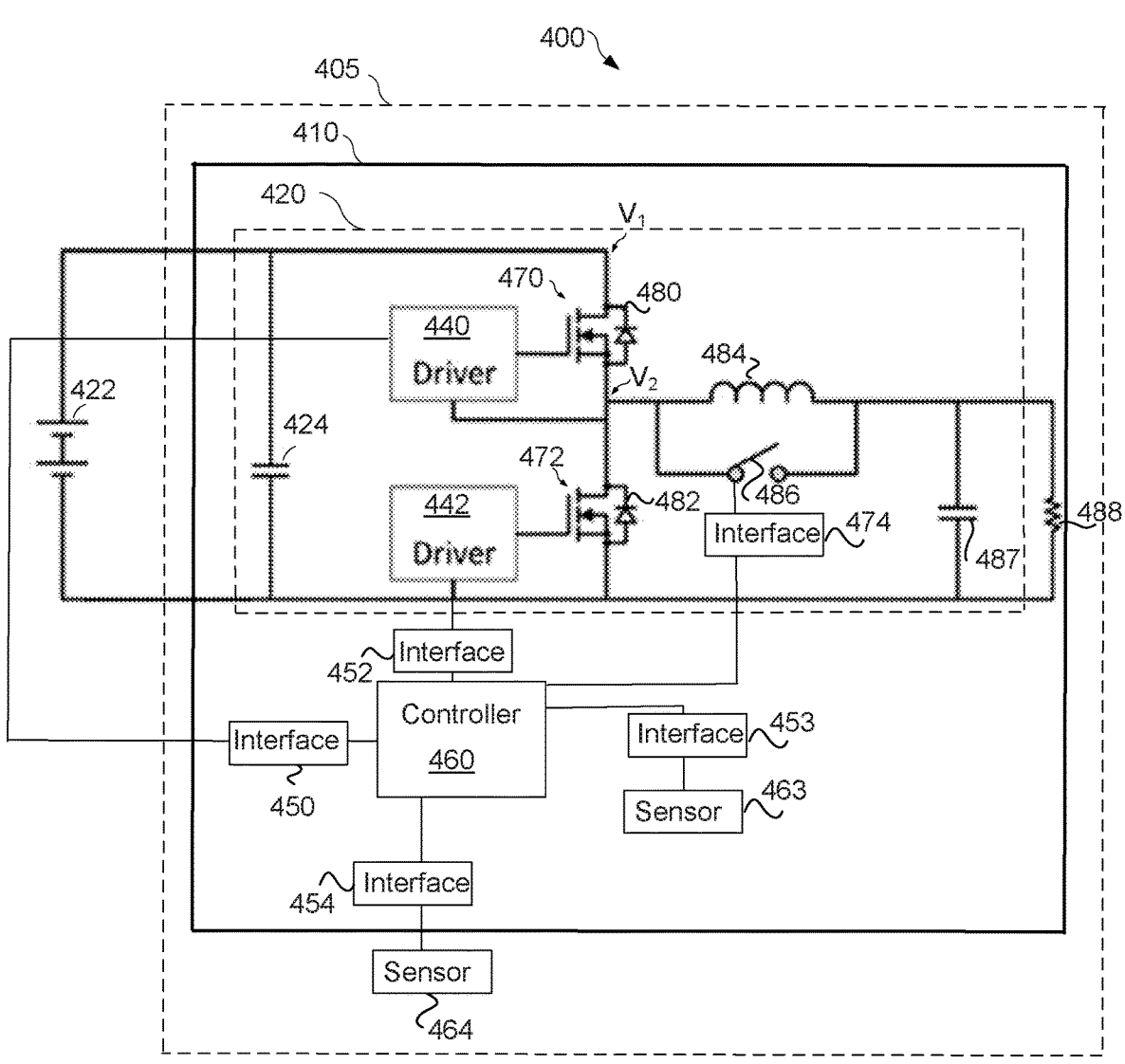

FIG. 4 is a block diagram illustrating details of a controller (e.g., in different embodiments the controller 160, 260 in FIGS. 1, 2) which coordinates operations of switches (e.g., in different embodiments the transistors 132, 134, 136, 138, 204, 206, in FIGS. 1, 2) within a converter circuit (e.g., in different embodiments the circuit 120, 220 in FIGS. 1, 2). The controller 160, 260 includes a dead time adjustment engine 402 which implements the dead time adjustment mechanism previously described, for example, with respect to FIG. 1. The dead time adjustment engine 402 implements the dead time adjustment mechanism in order to maintain or sustain soft switching, such as ZVS. The controller 160, 260 further includes a condensation addressing engine 404 which selectively modifies a dead time duration obtained from the dead time adjustment engine 402. In some embodiments, modification of the dead time duration may involve reducing an extent of soft switching when reducing the dead time duration in order to generate heat to reduce, eliminate, or prevent condensation.

Any engines referred to may comprise software, hardware (e.g., processors and/or circuitry) and/or firmware to perform and/or coordinate operations. Although engines are described separately to illustrate different concepts, it is contemplated that the engines described separately do not necessarily constitute different or separate physical processors or circuits. Rather, any of the engines may be integrated or combined into a single processor and/or single circuit.

Figure 5A:
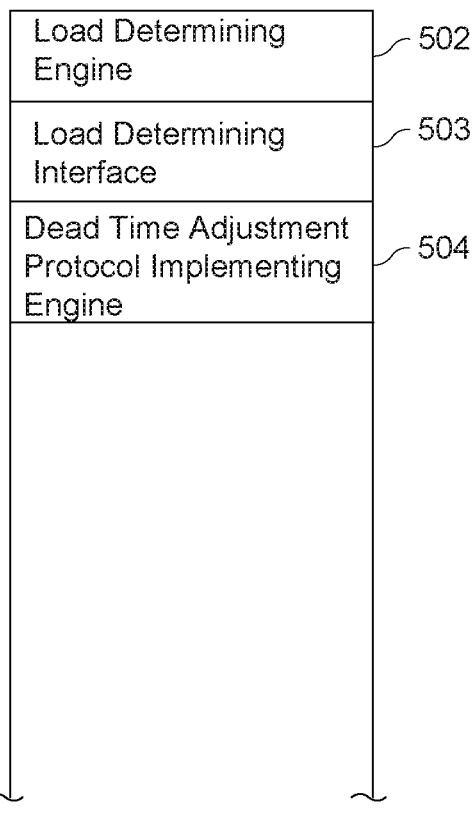
FIG. 5 is a block diagram illustrating details of a dead time adjusting engine within the controller of FIG. 4, according to some embodiments of the present invention.
Figure 5B:
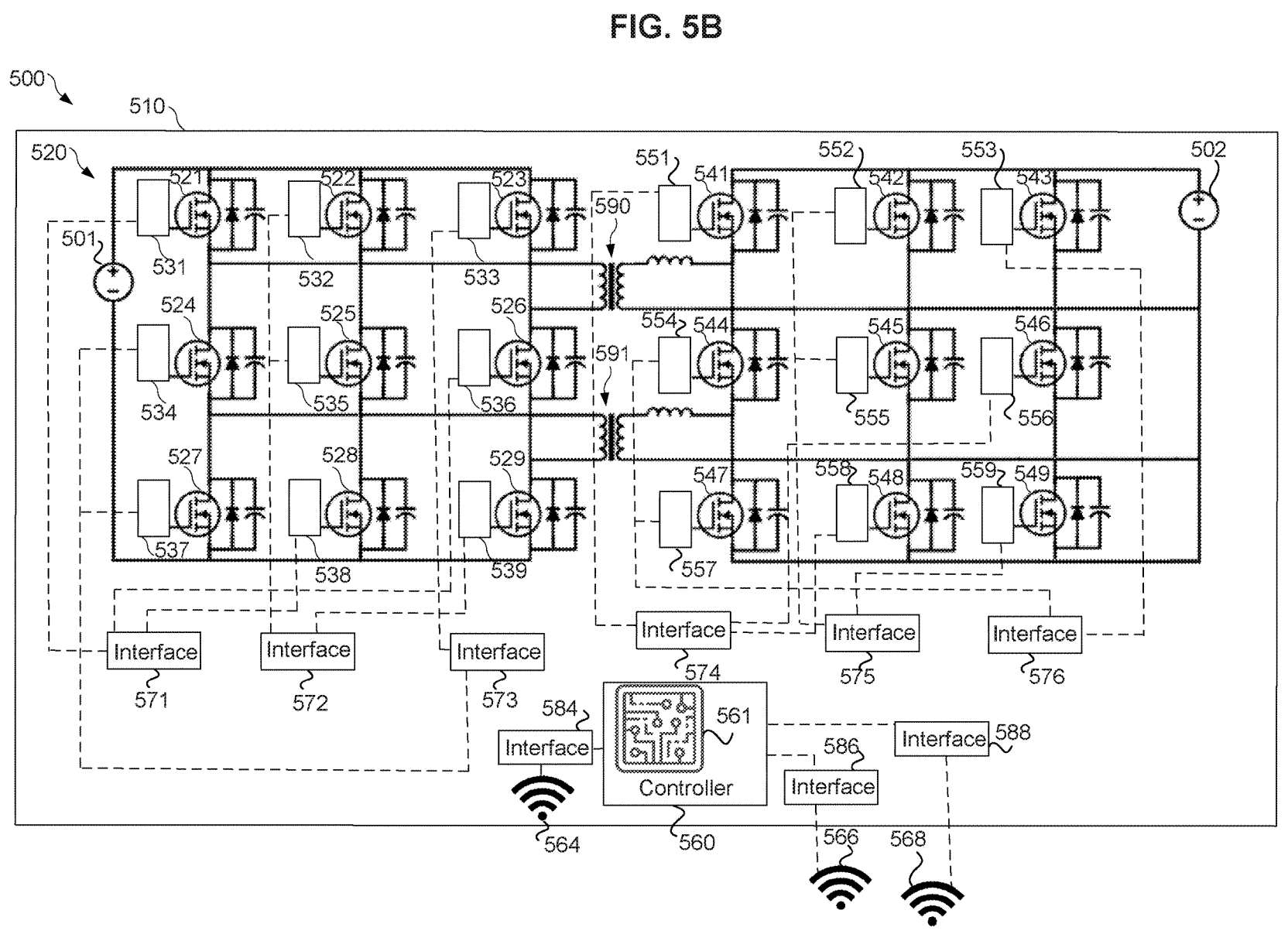

FIG. 5 is a block diagram illustrating details of the dead time adjustment engine 402, which determines and implements a dead time adjustment mechanism in order to maintain ZVS within a circuit (e.g., in different embodiments the circuit 120, 220 in FIGS. 1 and 2). The dead time adjustment engine 402 may include a load determining engine 502 to determine instantaneous and/or predicted future load attributes within the circuit. The load attributes may encompass a level of current flowing through the circuit, a change in the level of current, and/or a rate of change in the level of current. The load attributes, in some examples, may additionally include any of an efficiency of the converter circuit and/or a degree of utilization of the converter circuit. The load determining engine 502 may obtain the load attributes via one or more load determining interfaces 503, which link to one or more sensors that obtain the load attributes.

The dead time adjustment engine 402 may further include a dead time adjustment mechanism implementing engine 504 which implements or sets dead times sufficient for discharge of a capacitance across a capacitor (e.g., in different embodiments the capacitor 113, 115, 117, 119, 143, 145, 147, 149, 224, 226 in FIGS. 1, 2) and/or discharge of a voltage across a transistor (e.g., in different embodiments the transistor 132, 134, 136, 138, 204, 206, in FIGS. 1, 2), based on the load attributes obtained from the load determining engine 502. Under low load level conditions, the dead times may be higher than dead times under high load level conditions. One example of a dead time adjustment mechanism is described with respect to Table 3. The dead time adjustment engine 402 implements a dead time, depending on a load level, sufficient to maintain ZVS or near-ZVS. The dead time adjustment engine 402 may confirm that voltage across a transistor is zero or negligible (e.g., sufficiently close to zero) via a voltage clamp detection circuit, and/or a drain-to-source voltage-based trigger detection mechanism that triggers an alert when the voltage is sufficiently close to zero across a transistor.

Figure 6:
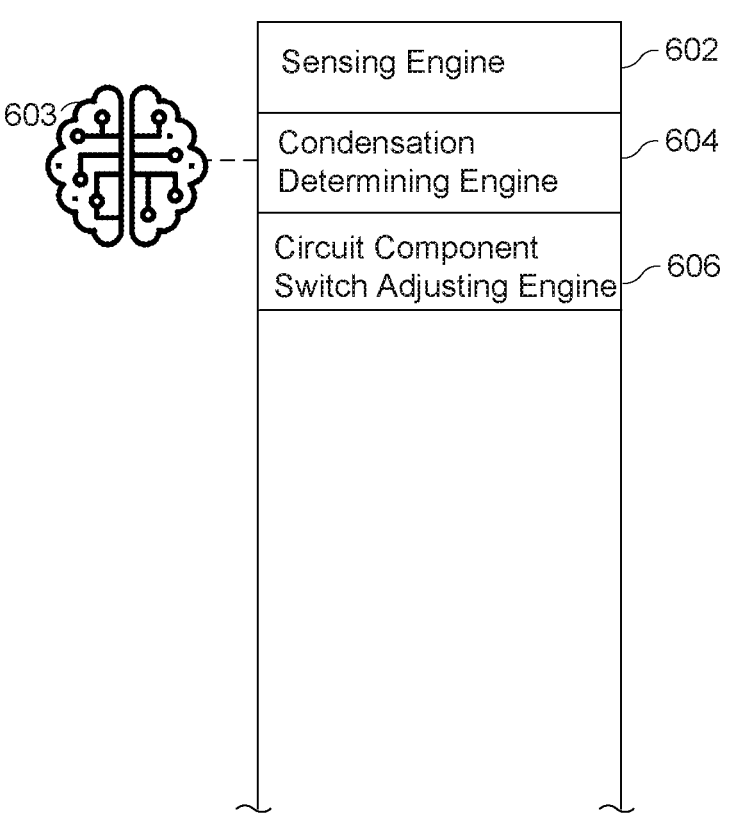
FIG. 6 is a block diagram illustrating details of a condensation addressing engine within the controller of FIG. 4, according to some embodiments of the present invention.

FIG. 6 is a block diagram illustrating details of the condensation addressing engine 404, which coordinates operations of switches (e.g., in different embodiments the transistors 132, 134, 136, 138, 204, 206 in FIGS. 1, 2 and/or the gate switch 338 of FIG. 3) within a converter circuit (e.g., in different embodiments the circuit 120, 220 in FIGS. 1, 2). The condensation addressing engine 404 obtains from sensor data environmental conditions such as internal and/or external temperature and/or internal and/or external humidity in the device. The condensation addressing engine 404 may determine a level (e.g., an amount and/or a probability) of condensation and adjust switching behaviors of the switches, such as times, durations, and/or patterns of ON and/or OFF states, to adjust previous or indicated dead times from the dead time adjustment engine 402.

The condensation addressing engine 404 may include hardware, software and/or firmware capable of secure and efficient communication with drivers (e.g., the drivers 121, 125, 131, 135, 234, 236, within FIGS. 1-2) that transmit one or more control signals to the transistors. The condensation addressing engine 404 may include a sensing engine 602, a condensation (amount or probability) determining engine 604, and a circuit component switch adjusting engine 606.

The sensing engine 602 may determine or obtain, from sensor data, ambient environmental conditions including an external humidity, an external temperature, an internal humidity, and/or an internal temperature. Here, internal may refer to being within a converter circuit (e.g., the circuit 120, 220 in FIGS. 1 and 2 in different embodiments) and/or within an enclosure in which the circuit 120, 220 is housed (e.g., the enclosure 110, 210 in FIGS. 1, 2 in different embodiments). The sensing engine 602 may obtain sensor data from one or more sensors (e.g., the sensors 164, 166, 264, 266 in FIGS. 1, 2, in different embodiments) via one or more interfaces (e.g., the interfaces 184, 186, 254, 256 in FIGS. 1, 2 in different embodiments). Details of the sensing engine 602 will be further described in FIG. 7.

The condensation determining engine 604 may determine an amount or probability of condensation within the circuit (e.g., the circuit 120, 220 in FIGS. 1, 2 in different embodiments). The condensation determining engine 604 may determine the amount or probability of condensation based on whether the internal temperature is at or above the dewpoint. In some embodiments, the condensation determining engine 604 may determine the level of condensation based on predicted or actual (hereinafter "predicted") dewpoint values as shown in Table 6 below.

For example, according to Table 6, a dewpoint at an external temperature of 10 degrees Celsius and 10 percent humidity is approximately negative 20.3 degrees. In some embodiments, the condensation determining engine 604 may determine the amount or probability of condensation based on modified predicted dewpoint values that deviate from those in Table 5, such as, modified values that deviate by +/−10 percent, +/−5 percent, +/−2 percent, +/−1 percent, or any suitable percentage between +/−0.1 percent and +/−20 percent, inclusive. For example, a modified value having a 10 percent deviation may be approximately negative 20.097 degrees or negative 20.603 degrees if the external temperature is 10 degrees Celsius and the relative humidity is 10 percent. In some embodiments, each of the modified values may deviate by a number rather than a percentage, such as by +/−0.1 degrees Celsius, +/−0.5 degrees Celsius, +/−1 degree Celsius, +/−2 degrees Celsius, or any suitable percentage between +/−0.1 degrees Celsius and +/−5 degrees Celsius, inclusive. In some embodiments, additionally or alternatively, the condensation determining engine 604 may determine the level of condensation based on one or more machine learning components, models, or techniques (hereinafter "components") 603. For example, the one or more machine learning components 603 may be trained using historical data that indicates whether or not condensation occurred under certain environmental conditions. The training of the machine learning components 603 may involve multiple stages and/or multiple training datasets, such as, a first dataset that includes example scenarios including contextual information associated with an occurrence or a nonoccurrence of condensation, and a second dataset that includes example scenarios including contextual information of incorrect predictions by the machine learning components 603. Incorrect predictions may encompass false positives and/or false negatives. For example, false positives may include the machine learning components 603 predicting the presence of condensation but no condensation actually was present. Meanwhile, false negatives may include the machine learning components 603 predicting the absence of condensation but condensation actually was present. The one or more machine learning components 603 may obtain feedback based on an actual existence or lack of condensation, as detected, for example, by a condensation sensor. The one or more machine learning components 603 may update based on the feedback. Details of the condensation determining engine 604 will be further described in FIG. 8.

TABLE 6

| External temperature ° C. | Relative Humidity % | | | | | | | | | |
|---|---|---|---|---|---|---|---|---|---|---|
| | 10 | 20 | 30 | 40 | 50 | 60 | 70 | 80 | 90 | 100 |
| 10 | −20.3 | −12.1 | −6.9 | −3.1 | 0 | 2.5 | 4.7 | 4.7 | 8.4 | 10 |
| 12 | −18.7 | −10.4 | −5.2 | −1.3 | 1.8 | 4.4 | 6.6 | 6.6 | 10.4 | 12 |
| 14 | −17.2 | −8.7 | −3.4 | 0.5 | 3.7 | 6.3 | 8.6 | 8.6 | 12.4 | 14 |
| 16 | −15.6 | −7 | −1.7 | 2.3 | 5.5 | 8.2 | 10.5 | 10.5 | 14.3 | 16 |
| 18 | −14.1 | −5.4 | 0.1 | 4.1 | 7.4 | 10.1 | 12.4 | 12.4 | 16.3 | 18 |
| 20 | −12.5 | −3.7 | 1.8 | 5.9 | 9.2 | 12 | 14.3 | 14.3 | 18.3 | 20 |
| 22 | −11 | −2 | 3.6 | 7.7 | 11.1 | 13.8 | 16.3 | 16.3 | 20.3 | 22 |
| 24 | −9.4 | −0.3 | 5.3 | 9.5 | 12.9 | 15.7 | 18.2 | 18.2 | 22.3 | 24 |
| 26 | −7.9 | 1.3 | 7.1 | 11.3 | 14.8 | 17.6 | 20.1 | 20.1 | 24.2 | 26 |
| 28 | −6.3 | 3 | 8.8 | 13.2 | 16.6 | 19.5 | 22 | 22 | 26.2 | 28 |
| 30 | −4.8 | 4.7 | 10.6 | 15 | 18.5 | 21.4 | 23.9 | 23.9 | 28.2 | 30 |
| 32 | −3.2 | 6.3 | 12.3 | 16.8 | 20.3 | 23.3 | 25.9 | 25.9 | 30.2 | 32 |
| 34 | −1.7 | 8 | 14.1 | 18.6 | 22.2 | 25.2 | 27.8 | 27.8 | 32.1 | 34 |
| 36 | −0.1 | 9.7 | 15.8 | 20.4 | 24 | 27.1 | 29.7 | 29.7 | 34.1 | 36 |
| 38 | 1.4 | 11.4 | 17.6 | 22.2 | 25.9 | 29 | 31.6 | 31.6 | 36.1 | 38 |
| 40 | 3 | 13 | 19.3 | 24 | 27.7 | 30.8 | 33.5 | 33.5 | 38.1 | 40 |

In some embodiments, if the condensation determining engine 604 determines that the internal temperature is at or above the dewpoint, the condensation determining engine 604 may determine that the amount or probability of condensation does not exceed the threshold amount or probability. On the other hand, if the condensation determining engine 604 determines that the internal temperature is below the dewpoint, then the condensation determining engine 604 may determine that the amount or probability of condensation does exceed the threshold level, and that modification of dead time by the circuit component switch adjusting engine 606 is to be implemented to address condensation. The modification of dead time may result in reduction of soft switching and/or ZVS.

The circuit component switch adjusting engine 606 may transmit, to one or more drivers (e.g., the drivers 121, 125, 131, 135, 234, 236 in FIGS. 1, 2 in different embodiments) via one or more interfaces (e.g., the interfaces 141, 145, 151, 155, 244, 246 in FIGS. 1, 2 in different embodiments) an indication of whether or not timing of switching the transistors (e.g., the transistors 122, 124, 132, 134, 204, 206 in FIGS. 1, 2 in different embodiments) is to be modified, to modify dead time determined by the dead time adjusting engine 402. In some examples, if the circuit component switch adjusting engine 606 receives an indication that dead time adjustment is to be implemented, the circuit component switch adjusting engine 606 may indicate specific timings, patterns, and/or sequences of when to switch the transistors ON or OFF. Additionally or alternatively, the circuit component switch adjusting engine 606 may transmit an indication that an adaptive dead time condensation modification mechanism (e.g., specifically to address condensation, separate from and subsequent to the adaptive dead time adjustment mechanism) is to be toggled ON.

In some examples, if the circuit component switch adjusting engine 606 indicates specific timings, the circuit component switch adjusting engine 606 may determine an extent of modification of the timings based on an amount of deviation between the internal temperature and a dewpoint (e.g., predicted dewpoint), and/or an amount of deviation between the amount or probability of condensation and the threshold amount or probability. For example, a larger deviation may indicate a higher level of urgency to address condensation. Thus, the larger deviation may entail a larger extent of the modification of the timings. As a specific illustrative example, if the internal temperature deviates by 0.1 degrees from the dewpoint temperature, the circuit component switch adjusting engine 606 may determine to decrease the dead time between switches in different current flow paths by a small duration, such as 0.1 microseconds. However, if the internal temperature deviates by 5 degrees from the dewpoint temperature, the circuit component switch adjusting engine 606 may determine to decrease the dead time between switches in different current flow paths by a larger duration, such as 0.5 microseconds. In other examples, the circuit component switch adjusting engine 606 may iteratively decrease the dead time between switches in different current flow paths, until the internal temperature does not exceed the dewpoint.

In some embodiments, if the circuit component switch adjusting engine 606 indicates whether or not to activate toggling of an adaptive dead time condensation modification mechanism, the circuit component switch adjusting engine 606 may select from multiple possible adaptive dead time condensation modification mechanisms based on the internal temperature and/or the aforementioned deviations (e.g., the deviation between the internal temperature and the dewpoint). For example, a first adaptive dead time control mechanism may be implemented for a first range of deviations between the internal temperature and the dewpoint (e.g., between 0.1 and 0.5 degrees Celsius, inclusive). A second adaptive dead time control mechanism, which adjusts dead times by a greater extent compared to the first adaptive dead time control mechanism, may be implemented for a second range of deviations between the internal temperature and the dewpoint (e.g., higher than 0.5 degrees Celsius and up to 1 degree Celsius). Details of the circuit component switch adjusting engine 606 will be further described in FIG. 9.

Figure 7:
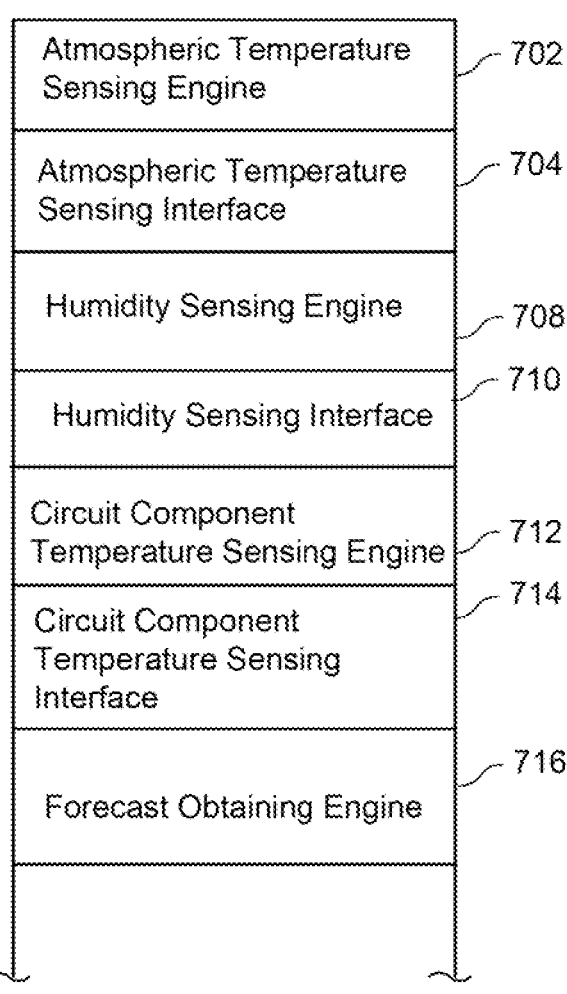
FIG. 7 is a block diagram illustrating details of a sensing engine within the condensation addressing engine of FIG. 6, according to some embodiments of the present invention.

FIG. 7 is a block diagram illustrating details of the sensing engine 602. The sensing engine 602 includes hardware, software and/or firmware capable of secure and efficient communication with the sensors (e.g., the sensors 164, 166, 264, 266 in FIGS. 1 and 2, in different embodiments, and one or more other sensors including condensation sensors). The sensing engine 602 includes an atmospheric temperature sensing engine 702, an atmospheric temperature sensing interface 704, a humidity sensing engine 708, a humidity sensing interface 710, a circuit component temperature sensing engine 712, a circuit component temperature sensing interface 714, and a forecast obtaining engine 716. The atmospheric temperature sensing engine 702 may obtain, via the atmospheric temperature sensing interface 704, an atmospheric temperature, for example, an ambient temperature that is external to the enclosure (e.g., the enclosure 110 of FIG. 1) of the converter circuit (e.g., the circuit 120 of FIG. 1). The atmospheric temperature sensing interface 704 may be implemented as the interface 186 of FIG. 1, the interface 256 of FIG. 2 in different embodiments. The atmospheric temperature sensing interface 704 may obtain sensor data of atmospheric temperatures from the sensor 166 and/or 277 in FIGS. 1 and 2, in different embodiments. The humidity sensing engine 708 may obtain an ambient humidity external to and/or internally within the enclosure (e.g., the enclosure 110 and/or 210 in FIGS. 1 and 2, in different embodiments), via the humidity sensing interface 710. The humidity sensing interface 710 may be implemented as any of the interface 186 and/or 184 of FIG. 1, the interface 254 and/or 256 of FIG. 2. The humidity sensing interface 710 may obtain sensor data of ambient humidity from the sensor 164, 166, 264, and/or 264 in FIGS. 1 and/or 2. Meanwhile, the circuit component temperature sensing engine 712 may obtain, via the circuit component temperature sensing interface 714, an internal temperature within the enclosure, such as within a heat sink (e.g., the heat sink 175 of FIG. 1). The circuit component temperature sensing interface 714 may be implemented as the interface 184 of FIG. 1 and/or the interface 254 of FIG. 2 in different embodiments. The circuit component temperature sensing interface 714 may obtain sensor data indicative of the internal temperature from the sensor 164 and/or 264 in FIGS. 1 and/or 2.

The forecast obtaining engine 716 may obtain one or more predictions, including predicted ambient conditions and/or internal conditions at future times. For example, the forecast obtaining engine 716 may obtain a predicted ambient temperature, a predicted ambient humidity, and/or a predicted internal temperature, which may be based on a predicted degree of utilization and/or predicted load level of the converter circuit. These predictions may be utilized, for example, by the condensation determining engine 604 and/or the circuit component switch adjusting engine 606, to proactively address potential condensation that is likely or possible to occur in order to proactively avoid failure of electronic components within the converter circuit.

Figure 8:
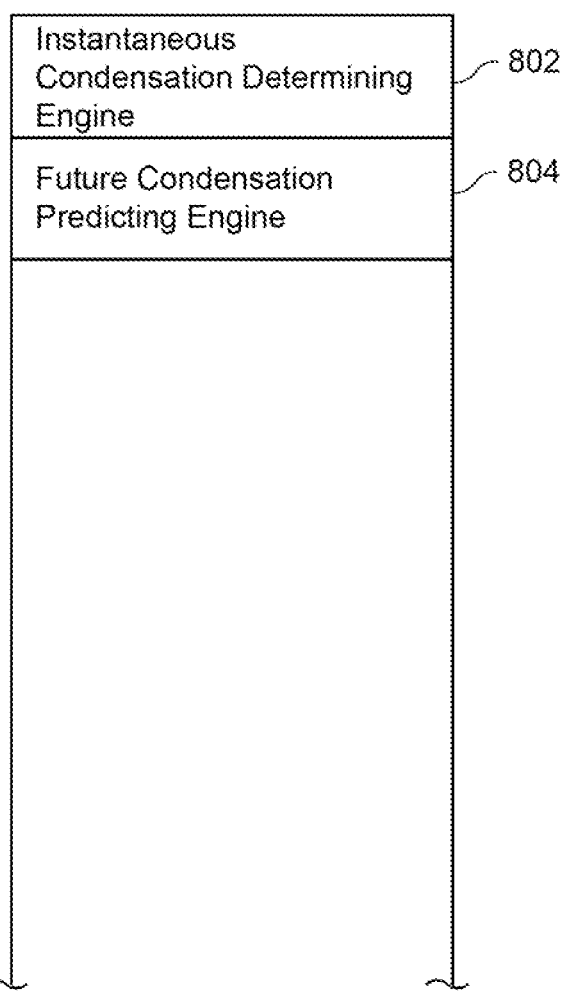
FIG. 8 is a block diagram illustrating details of a condensation determining engine within the condensation addressing engine of FIG. 6, according to some embodiments of the present invention.

FIG. 8 is a block diagram illustrating details of the condensation determining engine 604. The condensation determining engine 604 includes hardware, software and/or firmware capable of secure and efficient communication with the sensing engine 602 and/or other entities within the electric infrastructure (e.g., the infrastructure 100 of FIG. 1). The condensation determining engine 604 includes an instantaneous condensation determining engine 802 that determines an amount of condensation within the converter circuit (e.g., the converter circuit 120 of FIG. 1, the converter circuit 220 of FIG. 2 in different embodiments). The condensation determining engine 604 also includes a future condensation predicting engine 804 to predict a probability of condensation forming.

The instantaneous condensation determining engine 802 may determine an existence, of condensation being present. The determination may be based on whether the internal temperature is at or above the dewpoint. As alluded to previously, the dewpoint may be obtained or predicted based on Table 6, or other values that deviate from those in Table 6. For other dewpoints that are not directly indicated in Table 6, the instantaneous condensation determining engine 702 may derive the dewpoints using interpolation, other models, and/or machine learning techniques.

If the instantaneous condensation determining engine 802 determines that the internal temperature is at or above the dewpoint, the instantaneous condensation determining engine 802 may determine that the level of condensation does not exceed the threshold level. Under such scenarios, the circuit component switch adjusting engine 606 may determine that dead time between switches of different current flow paths is not to be modified, compared to the previously obtained dead time according to the dead time adjustment mechanism, thus maintaining ZVS. Otherwise, if the instantaneous condensation determining engine 802 determines that the internal temperature is below the dewpoint, the instantaneous condensation determining engine 802 may determine that the level of condensation does exceed the threshold level. Under such scenarios, the circuit component switch adjusting engine 606 may determine that dead time is to be decreased from the previously obtained dead time.

The future condensation predicting engine 804 may obtain one or more forecasts and predict whether, at some future time, the internal temperature has more than a threshold probability of falling below the predicted dewpoint in the future. Such a prediction may be caused by a predicted change in ambient temperature and/or ambient humidity resulting in a change in a predicted dewpoint, and/or a decrease in utilization or load of the converter circuit, which may result in a decrease in the internal temperature. The future condensation predicting engine 804 may therefrom compute a probability of condensation forming.

Figure 9:
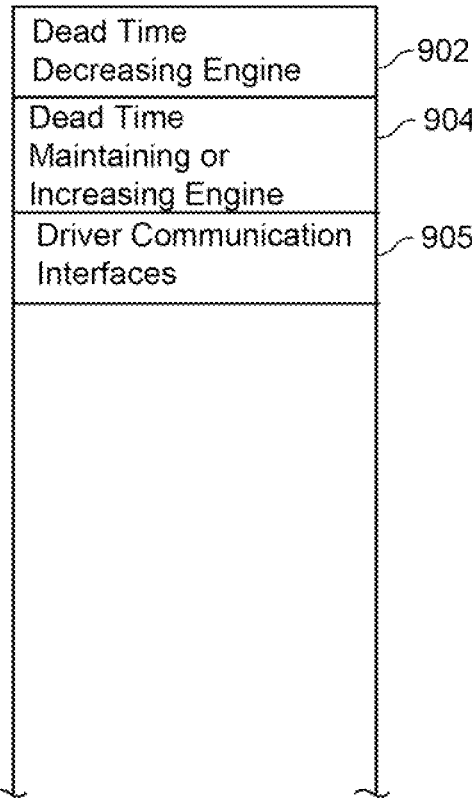
FIG. 9 is a diagram illustrating details of a circuit component switch adjusting engine within the condensation adjusting engine of FIG. 6, according to some embodiments of the present invention.

FIG. 9 is a block diagram illustrating details of the circuit component switch adjusting engine 606. The circuit component switch adjusting engine 606 includes hardware, software and/or firmware capable of secure and efficient communication with the sensing engine 602, condensation determining engine 604, interfaces to one or more drivers with the converter circuit (e.g., the interfaces 141, 145, 151, and/or 155 of FIG. 1, the interfaces 244 and/or 246 of FIG. 2, in different embodiments), and/or other entities within the electric infrastructure (e.g., the infrastructure 100 of FIG. 1, the infrastructure 200 of FIG. 2). The circuit component switch adjusting engine 606 includes a dead time decreasing engine 902, which is activated upon a determination that the amount or probability of condensation exceeds the threshold amount or probability. The dead time decreasing engine 902 may implement a reduction of the dead time, relative to the previously obtained dead time from the dead time adjustment engine 402, at a current time or may schedule a reduction of the dead time at a future time. The scheduling of the reduction of the dead time may, for example, be in response to input from the future condensation predicting engine 804 and/or the forecast obtaining engine 716. The extent to which the dead time is reduced may be based on an amount of deviation from the threshold amount or probability and/or a load level, as described, for example, with respect to FIG. 1 and Table 4.

The dead time decreasing engine 902 may, upon a determination of an amount or probability of condensation being above the threshold amount or probability, decrease a dead time between switches in different current flow paths. For example, referring to FIG. 1, the dead time decreasing engine 902 may decrease a duration of time in which all transistors on one side of the transformer 130, within the left bridge (e.g., the transistors 122, 124, 126, and 128) are switched OFF. Thus, a duration of the first operation cycle, in which the transistors 122 and 128 are in an ON state while the transistors 126 and 124 are in an OFF state, may be increased. Additionally or alternatively, a duration of the second operation cycle, in which the transistors 126 and 124 are in an ON state while the transistors 122 and 128 are in an OFF state, may be increased. Likewise, the dead time decreasing engine 902 may decrease a duration of time in which all transistors on the opposite side of the transformer 130, within the right bridge (e.g., the transistors 132, 134, 136, and 138) are switched OFF. Thus, a duration of the third operation cycle, in which the transistors 132 and 138 are in an ON state while the transistors 136 and 134 are in an OFF state, may be increased. Additionally or alternatively, a duration of the fourth operation cycle, in which the transistors 136 and 134 are in an ON state while the transistors 132 and 138 are in an OFF state, may be increased.

As alluded to previously, the extent of the decrease in dead time may depend on an amount of a deviation between the internal temperature and the predicted dewpoint, and/or amount of a deviation between the level of condensation and the threshold level. In some embodiments, the greater the deviation, the greater the extent of the decrease. In other embodiments, the dead time decreasing engine 902 may iteratively decrease the dead time by fixed durations (e.g., 0.1 microseconds) until the internal temperature does not exceed the predicted dewpoint.

The circuit component switch adjusting engine 606 also includes a dead time maintaining or increasing engine 904. In some examples, instead of decreasing a duration of the dead time from the previously obtained dead time from the dead time adjustment engine 402, the dead time maintaining or increasing engine 904 may maintain a duration of dead time but instead adjust a timing of the dead time. For example, the adjusting of the timing of the dead time may coincide with certain cycles in which condensation is less likely to occur. In other examples, following a reduction in the dead time (e.g., implemented by the dead time decreasing engine 902), the transistors may no longer be operating within full ZVS. The instantaneous condensation determining engine 802 may continuously determine the level of condensation within the enclosure (e.g., the enclosure 110, 210 in FIGS. 1 and 2 in different embodiments). If the instantaneous condensation determining engine 802 determines that the level of condensation is less than the threshold level, then the dead time maintaining or increasing engine 904 may increase the dead time to at least partially restore

US 12,647,023 B2

27
28

ZVS. The extent of the increase of the dead time may depend on and be correlated with the internal temperature, such as, a rate of increase of the internal temperature, and/or an extent to which the internal temperature within the enclosure exceeds a threshold temperature (e.g., dewpoint). For example, the higher the internal temperature, the higher the extent of the increase of the dead time.

The circuit component switch adjusting engine 606 also includes driver communication interfaces 905 to communicate with the drivers (e.g., the drivers 121, 125, 131, and/or 135 of FIG. 1, the drivers 234 and/or 236 of FIG. 2, in different embodiments) that directly transmit pulses to the transistors (e.g., the transistors 122, 124, 126, 128, 132, 134, 136, and/or 138 of FIG. 1, the transistors 204 and/or 206 of FIG. 2, in different embodiments) to control switching ON and OFF of the transistors. The driver communication interfaces 905 may be implemented as the interfaces 141, 145, 151, and/or 155 of FIG. 1, and/or the interfaces 244 and/or 246 of FIG. 2.

The solution described herein prolongs a lifespan of converter circuitry, by preventing condensation as a first priority via controlling of switching, as well as preventing overheating. In addition, the solution maintains efficiency and prolongs a lifespan within the converter circuitry by preventing or minimizing switching losses within the implementation of soft switching, such as ZVS. To elaborate, ZVS may occur under conditions requiring a sufficiently high energy stored within a tanking inductor to charge and discharge power semiconductor device output capacitances, a current polarity through the power devices at the instance of switching being in a direction to simultaneously charge and/or discharge device capacitances, and sufficient dead time. Challenges of maintaining sufficient dead time are attributed to dependencies of dead time upon magnitudes of a load current and device capacitances, thus resulting in switching losses. Such challenges are especially magnified under light loads. In light of such challenges, the adaptive dead time adjustment mechanism may be implemented to maintain ZVS at different load conditions. However, when condensation occurs or is likely to occur, a duration and/or timing of the dead time determined according to the dead time adjustment mechanism may be modified, depending on a load level and the level of condensation.

The solution described herein is superior to other potential techniques such as placing the enclosure in a place with minimal temperature fluctuations, ventilation, air-conditioning, dehumidifiers, heaters, filling the enclosure with dry nitrogen, and or use of a desiccant such as silica gel. These aforementioned potential techniques have limitations including infeasibility for transport, requirements of additional hardware, requiring hermetic sealing of the enclosure which limits heat dissipation and thermal management.

Figure 10:
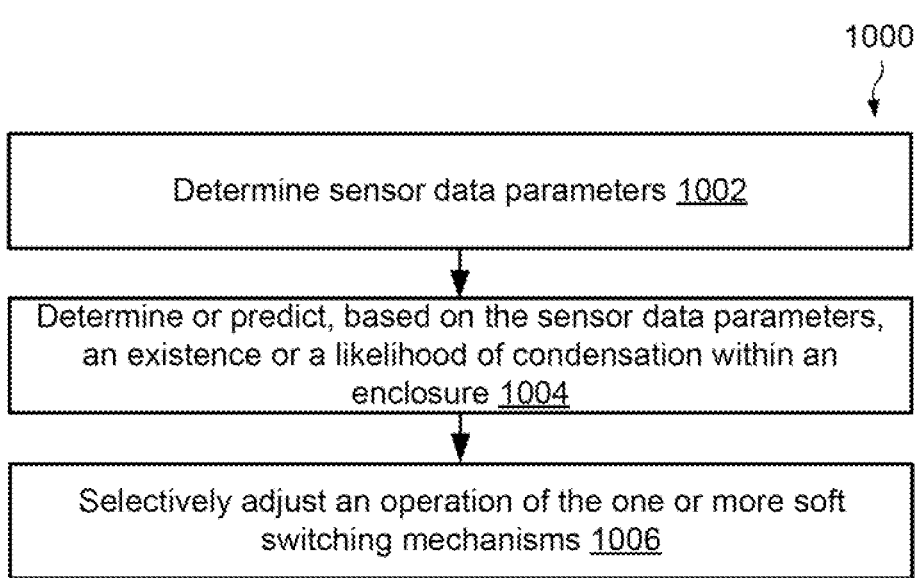
FIG. 10 is a flowchart illustrating details of a method of detecting and responding to condensation within a device, according to some embodiments of the present invention.

FIG. 10 is a flowchart of a method 1000 of controlling converter circuitry (e.g., the converter circuit 120 of FIG. 1, the converter circuit 220 of FIG. 2 in different embodiments) that includes one or more soft switching mechanisms. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

Method 1000 begins with step 1002, in which the controller 160, in particular, the sensing engine 602) obtain sensor data. The sensor data may be obtained, via interfaces (e.g., the interfaces 184, 186 of FIG. 1) that connect to one or more sensors (e.g., the sensors 164, 166 of FIG. 1). The sensor data is indicative of a first temperature inside the enclosure, an atmospheric temperature, an internal humidity inside the enclosure, and/or an atmospheric humidity. In step 1004, the condensation determining engine 604 may, based on the sensor data, determine an existence or a probability of condensation within the enclosure. For example, the determination may be based on a comparison of the first temperature and a predicted dewpoint, which may be based on the atmospheric temperature and the atmospheric humidity (external to and/or internal to the enclosure). In step 1006, the circuit component switch adjusting engine 606 may, based on the existence or the probability of condensation within the enclosure, decrease a dead time of the one or more soft switching mechanisms. For example, if the condensation determining engine 604 predicts that the level of condensation (e.g., existence, amount, and/or probability of condensation) exceeds a threshold level, the circuit component switch adjusting engine 606 may decrease a duration of a dead time. The dead time may refer to switches from different current flow paths all switched or transitioned to an OFF state, in order for sufficient discharging of a capacitance of a capacitor in parallel with a switch, and/or sufficient discharging of a voltage across the switch.

Figure 11:
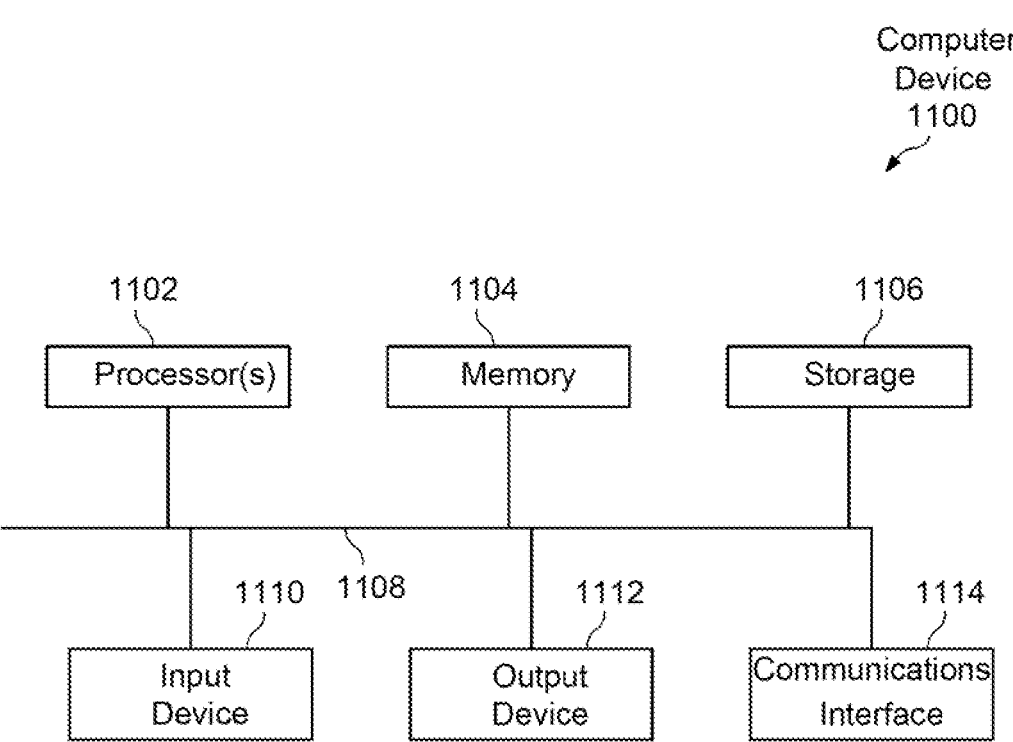
FIG. 11 is a block diagram illustrating details of a computing system, according to some embodiments of the present invention.

FIG. 11 is a block diagram of a computing device 1100. Any of the controller 160 and/or engines described herein may comprise an instance of one or more computing devices 1100. In some embodiments, functionality of the computing device 1100 is improved to perform some or all of the functionality described herein. The computing device 1100 comprises a processor 1102, memory 1104, storage 1106, an input device 1110, a communication network interface 1114, and an output device 1112 communicatively coupled to a communication channel 1108. The processor 1102 is configured to execute executable instructions (e.g., programs), and may be implemented as, or part of, the controller 160, 260, and/or 460. In some embodiments, the processor 1102 comprises circuitry or any processor capable of processing the executable instructions.

The memory 1104 stores data. Some examples of memory 1104 include storage devices, such as RAM, ROM, RAM cache, virtual memory, etc. In various embodiments, working data is stored within the memory 1104. The data within the memory 1104 may be cleared or ultimately transferred to the storage 1106.

The storage 1106 includes any storage configured to retrieve and store data. Some examples of the storage 1106 include flash drives, hard drives, optical drives, cloud storage, and/or magnetic tape. In some embodiments, storage 1106 may include RAM. Each of the memory 1104 and the storage 1106 comprises a computer-readable medium, which stores instructions or programs executable by processor 1102.

The input device 1110 may be any device that inputs data (e.g., mouse and keyboard). The output device 1112 may be any device that outputs data and/or processed data (e.g., a speaker or display). It will be appreciated that the storage 1106, input device 1110, and output device 1112 may be optional. For example, the routers/switchers may comprise the processor 1102 and memory 1104 as well as a device to receive and output data (e.g., the communication network interface 1114 and/or the output device 1112).

The communication network interface 1114 may be coupled to a network (e.g., the network 162) via the link 1108. The communication network interface 1114 may support communication over an Ethernet connection, a serial connection, a parallel connection, and/or an ATA connection. The communication network interface 1114 may also support wireless communication (e.g., 802.11 a/b/g/n, WiMax, LTE, WiFi). It will be apparent that the communication network interface 1114 may support many wired and wireless standards.

It will be appreciated that the hardware elements of the computing device 1100 are not limited to those depicted. A computing device 1100 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1102 and/or a co-processor located on a GPU (i.e., NVidia).

It will be appreciated that an "engine," "system," "datastore," and/or "controller" may comprise software, hardware, firmware, and/or circuitry. In one example, one or more software programs comprising instructions capable of being executable by a processor may perform one or more of the functions of the engines, systems, datastores, and/or controller described herein. In another example, circuitry may perform the same or similar functions. Alternative embodiments may comprise more, less, or functionally equivalent engines, systems, datastores, or databases, and still be within the scope of present embodiments. For example, the functionality of the various engines, systems, datastores, and/or controller may be combined or divided differently. The datastores may include cloud storage. It will further be appreciated that the term "or," as used herein, may be construed in either an inclusive or exclusive sense. Moreover, plural instances may be provided for resources, operations, or structures described herein as a single instance. It will be appreciated that the term "request" shall include any computer request or instruction, whether permissive or mandatory.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or controller described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. References to "approximately" may be construed to encompass values within a certain range of the specified value, such as within 25 percent, 10 percent, 5 percent, 1 percent, or any other applicable value. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Figure 12:
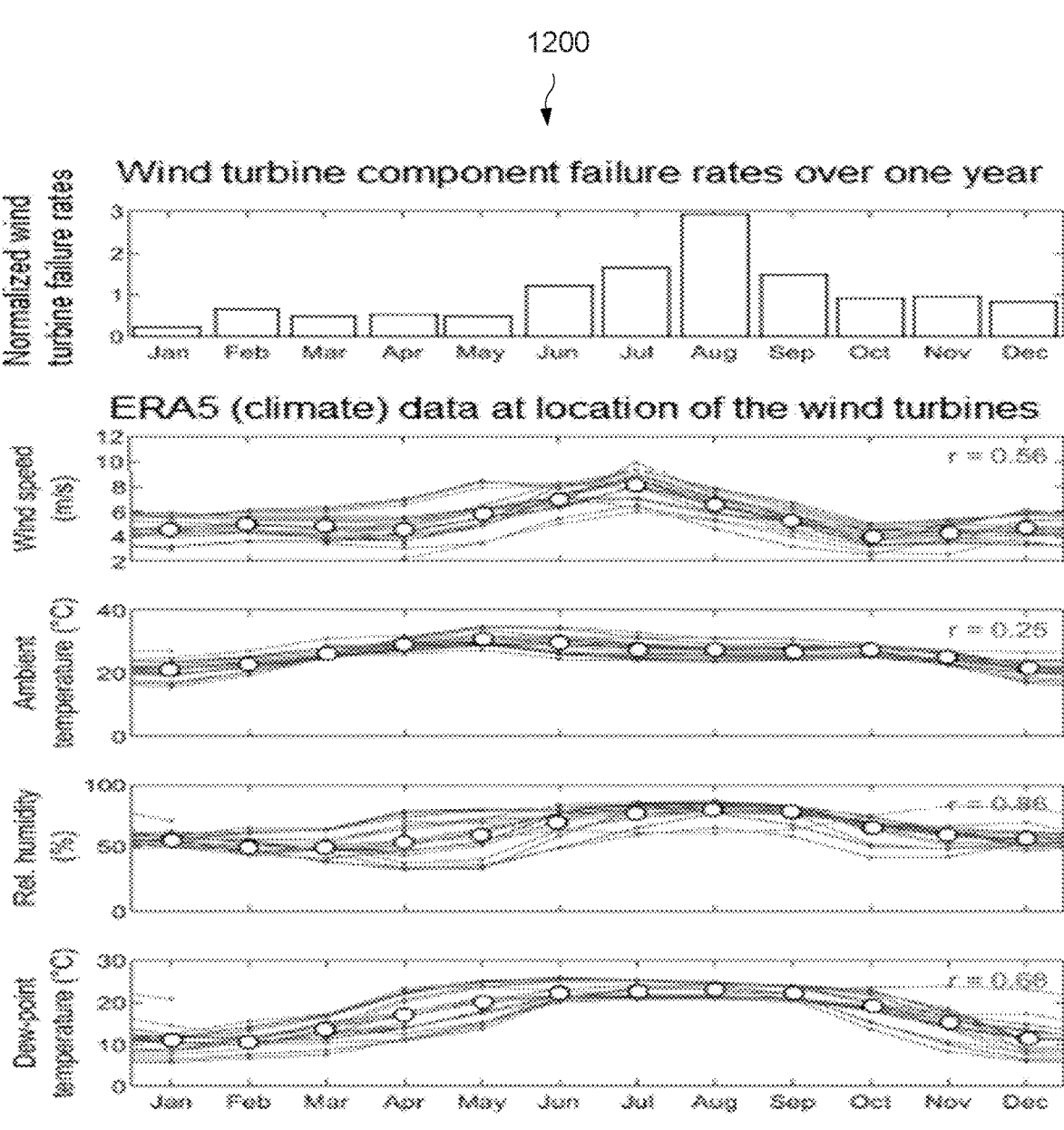
FIG. 12 is a chart illustrating correlations of converter damage with condensation levels, according to some embodiments of the present invention.

As shown in FIG. 12, because condensation threatens the circuit more than heat, reducing, eliminating or preventing condensation may be considered higher priority than keeping the circuit cool and avoiding power losses. In particular, chart 1200 illustrates a normalized rate of failures of wind turbines at a particular location over a one-year time period. Official climate data, including wind speed, ambient temperature, relative humidity, and dew-point temperature, from a Fifth Generation European Centre for Medium-Range Weather Forecasts (ECMWF) atmospheric reanalysis of the global climate (ERA5) was obtained over the same one-year time period at the same location of the wind turbines. In chart 1200, a correlation between the relative humidity and the normalized rate of wind turbine failures was higher than other correlations between other climate factors and the normalized rate of wind turbine failures.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system for controlling converter circuitry, the converter circuitry comprising switches and one or more soft switching mechanisms within an enclosure, the system comprising:

one or more sensors for determining sensor data, the sensor data including ambient parameters internal to the enclosure;

a controller comprising:

one or more sensor interfaces configured to communicate with the one or more sensors to receive the sensor data;

one or more hardware processors; and memory storing computer instructions, the computer instructions when executed by the one or more hardware processors configured to perform:

determining, based on the sensor data, an existence or probability of condensation within the enclosure; and decreasing a dead time of the one or more soft switching mechanisms based on the existence or probability of condensation within the enclosure, the dead time being based on discharging capacitance through the one or more soft switching mechanisms, the decreasing the dead time thereby increasing heat in the converter circuitry to assist in addressing the existence or probability of condensation.

2. The system of claim 1, wherein the switches include transistors.

3. The system of claim 2, wherein the one or more soft switching mechanisms includes zero-voltage switching.

4. The system of claim 3, wherein the one or more soft switching mechanisms includes one or more transistors.

5. The system of claim 4, wherein the converter circuitry includes a dual-active bridge (DAB).

6. The system of claim 5, wherein the converter circuitry includes one or more drivers for controlling the soft switching mechanisms of the circuitry and for controlling the dead time of the one or more soft switching mechanisms in response to control signals from the controller.

7. The system of claim 1, wherein the ambient parameters include temperature and humidity.

8. The system of claim 1, wherein the sensor data further includes ambient parameters external to the enclosure.

9. The system of claim 1, wherein the decreasing of the dead time is based on a deviation of the existence or probability of condensation from a threshold value.

10. The system of claim 9, wherein the threshold value is based on a predetermined dewpoint.

11. The system of claim 1, wherein the probability of condensation is a probability of an existence of condensation within the enclosure.

12. The system of claim 1, wherein the probability of condensation is a probability of generation of condensation within the enclosure at a future time.

13. The system of claim 1, wherein the converter circuitry includes a half bridge.

14. The system of claim 1, wherein the decreasing adjusting the dead time of the one or more soft switching mechanisms includes adaptively adjusting the dead time based on load characteristics of a load.

15. The system of claim 14, wherein the adaptively adjusting the dead time includes adjusting the dead time more when the load is lower and less when the load is higher.

16. The system of claim 1, wherein the addressing the existence or probability of condensation includes preventing the condensation.

17. The system of claim 1, wherein the addressing the existence or probability of condensation includes reducing the condensation.

18. The system of claim 1, wherein the addressing the existence or probability of condensation includes eliminating the condensation.

19. A method for controlling converter circuitry, the converter circuitry comprising switches and one or more soft switching mechanisms within an enclosure, the method comprising:

using one or more sensors to determine sensor data, the sensor data including ambient parameters internal to the enclosure;

determining, based on the sensor data, an existence or probability of condensation within the enclosure; and decreasing a dead time of the one or more soft switching mechanisms based on the existence or probability of condensation within the enclosure, the dead time being based on discharging capacitance through the one or more soft switching mechanisms, the decreasing the dead time thereby increasing heat in the converter circuitry to assist in addressing the existence or probability of condensation.

20. The method of claim 19, wherein the converter circuitry includes a dual-active bridge (DAB).

21. The method of claim 19, wherein the ambient parameters include temperature and humidity.

22. The method of claim 19, wherein the sensor data further includes ambient parameters external to the enclosure.

23. The method of claim 19, wherein the decreasing the dead time is based on a deviation of the existence or probability of condensation from a threshold value.

24. The method of claim 19, wherein the probability of condensation is a probability of an existence of condensation within the enclosure.

25. The method of claim 19, wherein the probability of condensation is a probability of generation of condensation within the enclosure at a future time.

26. The method of claim 19, wherein the decreasing the dead time of the one or more soft switching mechanisms includes adaptively adjusting the dead time based on load characteristics of a load.

27. The method of claim 26, wherein the adaptively adjusting the dead time includes adjusting the dead time more when the load is lower and less when the load is higher.

* * * * *